US011883769B2

(12) United States Patent
Robb et al.

(10) Patent No.: US 11,883,769 B2
(45) Date of Patent: *Jan. 30, 2024

(54) MIST AND VAPOR ELIMINATING FILTER, DEVICE, SYSTEM AND METHOD OF USE

(71) Applicant: Pall Corporation, Port Washington, NY (US)

(72) Inventors: James Robb, Portsmouth (GB); Stuart M. Skull, Portsmouth (GB); Paul D. Roux, Portsmouth (GB)

(73) Assignee: Pall Corporation, Port Washington, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/592,003

(22) Filed: Feb. 3, 2022

(65) Prior Publication Data

US 2023/0241537 A1 Aug. 3, 2023

(51) Int. Cl.
*B01D 46/00* (2022.01)
*B01D 53/04* (2006.01)
(Continued)

(52) U.S. Cl.
CPC ..... *B01D 46/0036* (2013.01); *B01D 46/0031* (2013.01); *B01D 46/2403* (2013.01); *B01D 46/521* (2013.01); *B01D 46/64* (2022.01); *B01D 53/0407* (2013.01); *B64D 13/06* (2013.01); *B01D 2253/102* (2013.01); *B01D 2253/11* (2013.01); *B01D 2257/708* (2013.01); *B01D 2257/80* (2013.01); *B01D 2275/201* (2013.01); *B01D 2279/40* (2013.01);
(Continued)

(58) Field of Classification Search
CPC ............ B01D 46/0036; B01D 46/0031; B01D 46/2403; B01D 46/521; B01D 46/64; B01D 53/0407; B01D 53/04; B01D 2253/102; B01D 2253/11; B01D 2257/708; B01D 2257/80; B01D 2275/201; B01D 2279/40; B64D 13/06; B64D 2013/0644; B64D 2013/0651; B64D 2013/0688
USPC ....... 95/141, 143; 96/134; 55/318–337, 428, 55/490–519
See application file for complete search history.

(56) References Cited

U.S. PATENT DOCUMENTS 2,823,760 A * 2/1958 Andersen ............... B01D 45/06
55/327
3,834,126 A * 9/1974 DiMinno, Jr. ............ F24F 3/14
55/327
(Continued)

FOREIGN PATENT DOCUMENTS

CN 108579230 A 9/2018
DE 10 2018 215 603 A1 3/2020
(Continued)

OTHER PUBLICATIONS

Singapore Intellectual Property Office, Search Report issued in counterpart Singapore Patent Application No. 10202260409U, dated Apr. 19, 2023.
(Continued)

*Primary Examiner* — Frank M Lawrence, Jr.
(74) *Attorney, Agent, or Firm* — Leydig, Voit & Mayer, Ltd.

(57) ABSTRACT

Mist and vapor eliminating filters, devices, methods of filtering aircraft air using the devices, and systems including the devices, are disclosed.

20 Claims, 28 Drawing Sheets

(51) Int. Cl.
  *B01D 46/64*    (2022.01)
  *B01D 46/24*    (2006.01)
  *B01D 46/52*    (2006.01)
  *B64D 13/06*    (2006.01)

(52) U.S. Cl.
  CPC ............ *B64D 2013/0644* (2013.01); *B64D 2013/0651* (2013.01); *B64D 2013/0688* (2013.01)

(56) References Cited

U.S. PATENT DOCUMENTS

| | | | |
|---|---|---|---|
| 4,130,487 A | | 12/1978 | Hunter |
| 4,243,397 A | | 1/1981 | Tokar et al. |
| 4,995,974 A | * | 2/1991 | Lorey ............... B01D 46/0031 210/247 |
| 5,106,397 A | * | 4/1992 | Jaroszczyk ...... F02M 35/02483 55/306 |
| 5,284,997 A | * | 2/1994 | Spearman ............. B01D 46/64 588/249 |
| 5,750,024 A | | 5/1998 | Spearman |
| 6,302,932 B1 | | 10/2001 | Unger et al. |
| 6,833,023 B1 | | 12/2004 | Vandenberghe et al. |
| 7,520,913 B2 | | 4/2009 | Mills et al. |
| 7,608,124 B2 | | 10/2009 | Geyer, III |
| 8,440,002 B2 | | 5/2013 | Jarrier et al. |
| 2002/0088245 A1 | | 7/2002 | Sauterleute et al. |
| 2007/0039865 A1 | | 2/2007 | Jiang et al. |

FOREIGN PATENT DOCUMENTS

| | | |
|---|---|---|
| DE | 10 2020 118 472 A1 | 1/2022 |
| GB | 2 089 237 A | 6/1982 |
| WO | WO 2004/094036 A1 | 11/2004 |
| WO | WO 2017/184780 A1 | 10/2017 |
| WO | WO 2019/173736 A1 | 9/2019 |

OTHER PUBLICATIONS

European Patent Office, Extended European Search Report issued in counterpart European Patent Application No. 23150794.8, dated Jul. 14, 2023.

* cited by examiner

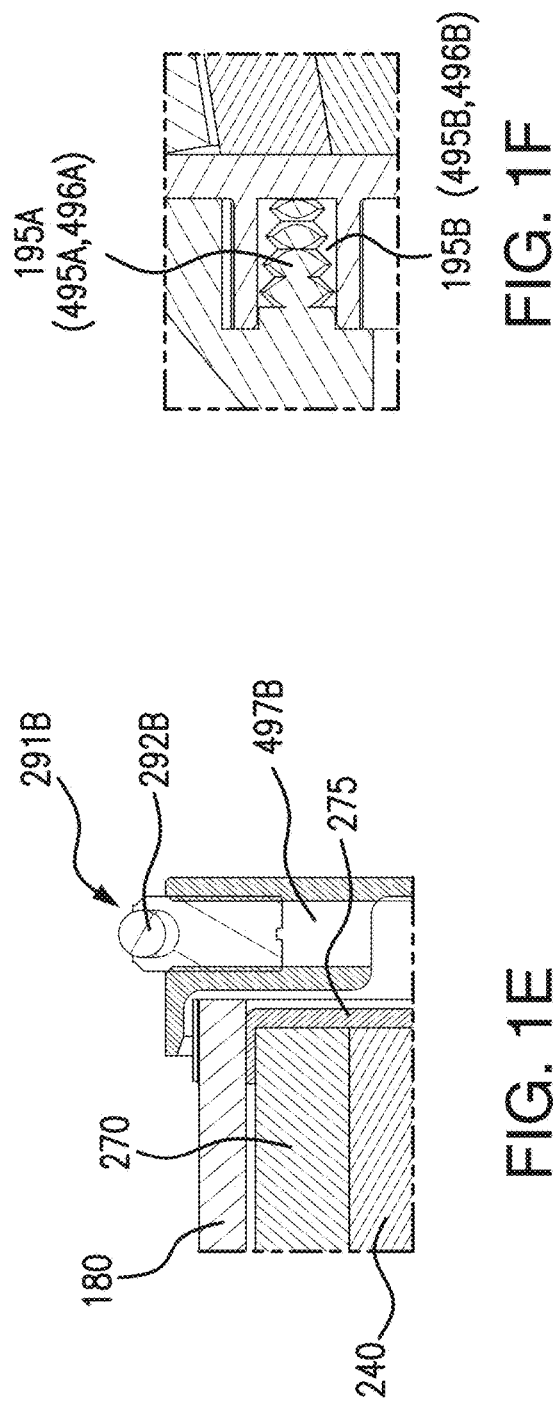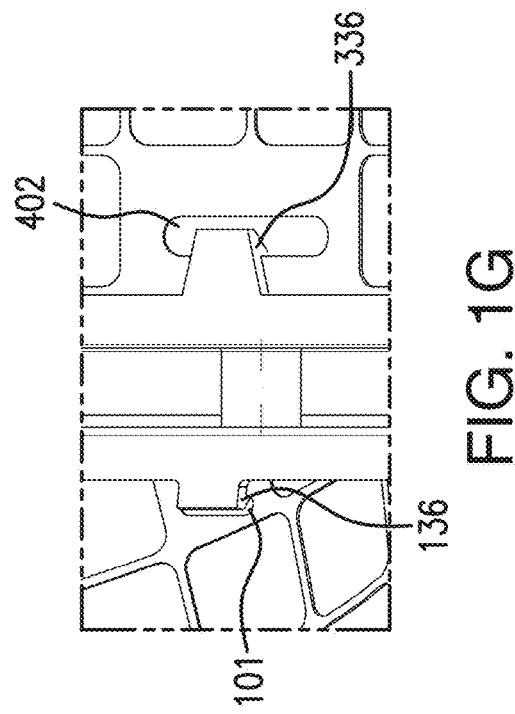

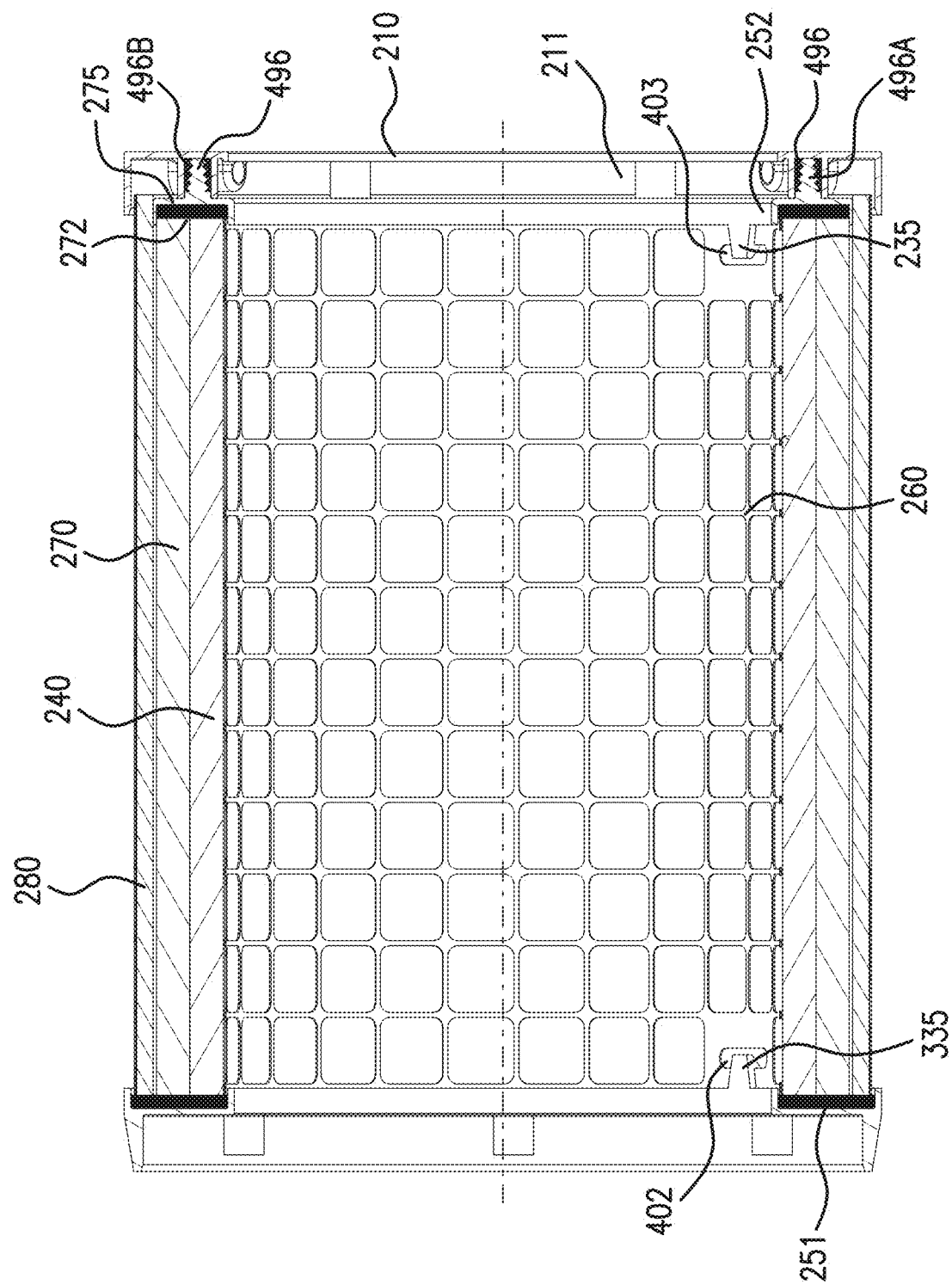

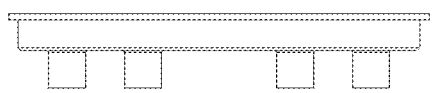
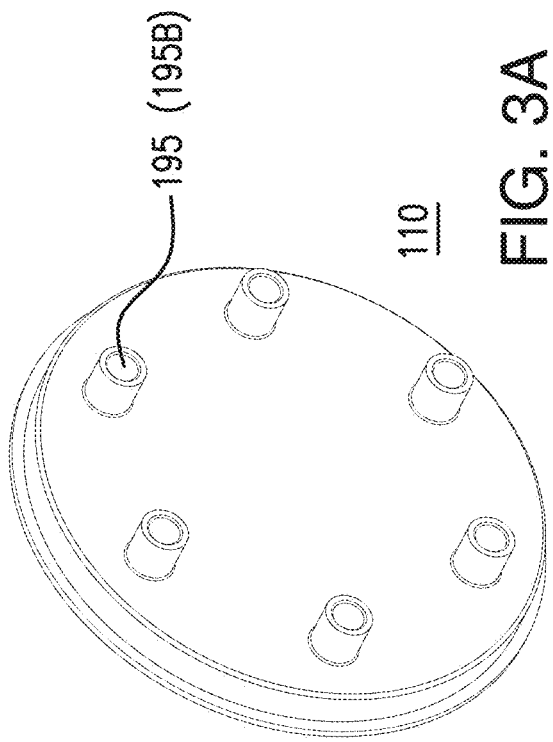
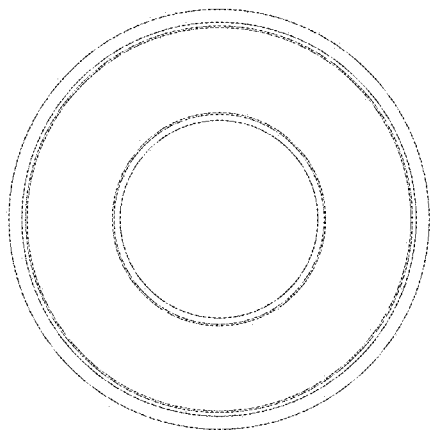

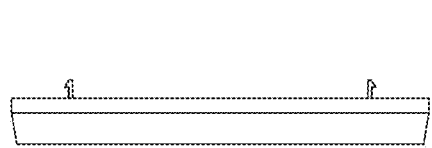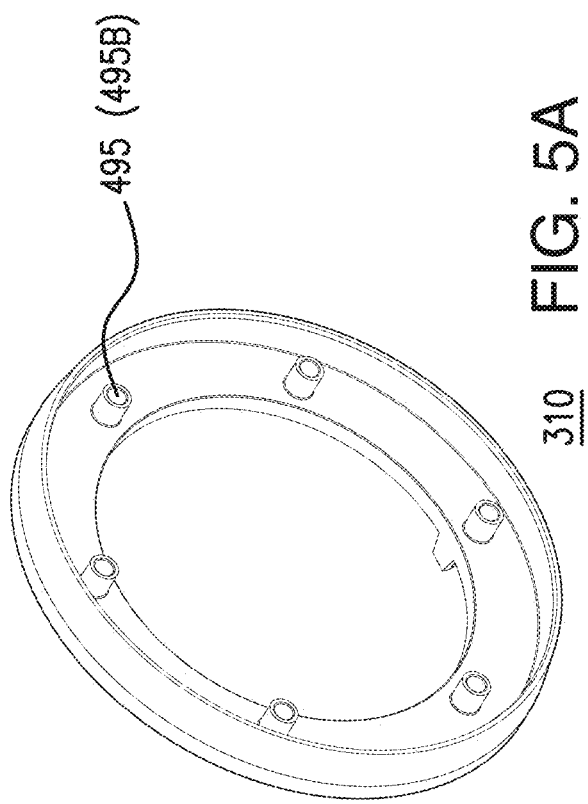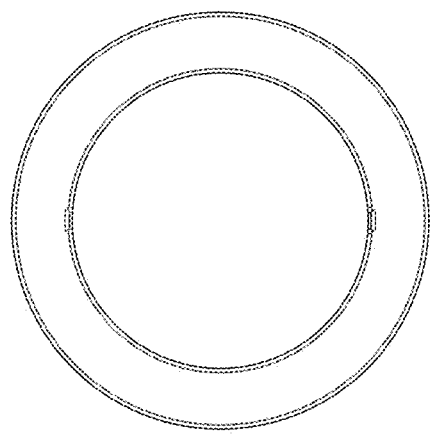
FIG. 5C
FIG. 5A
FIG. 5B

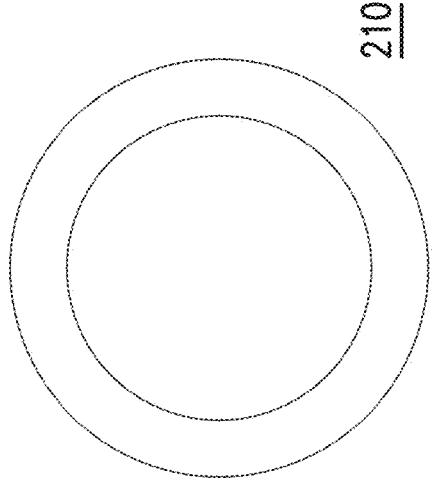
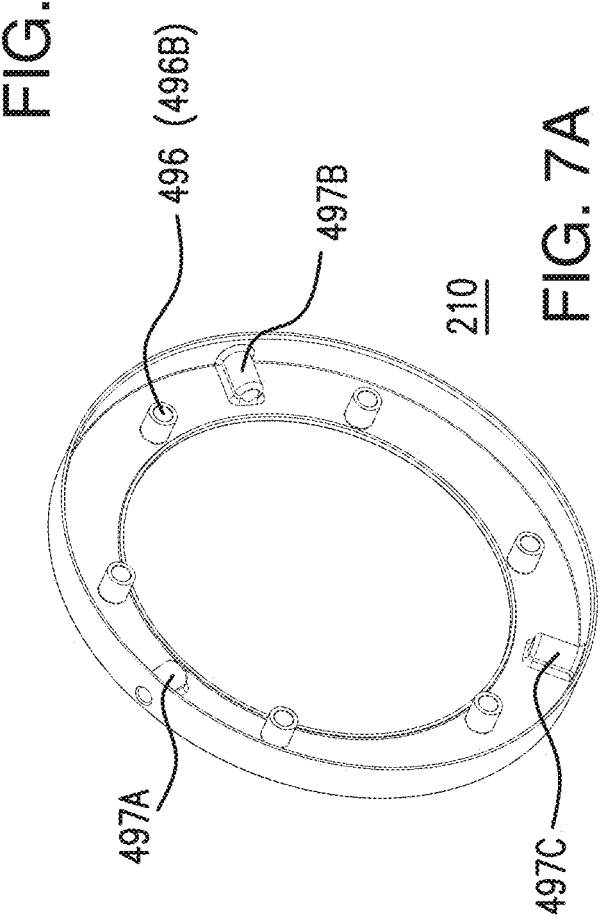

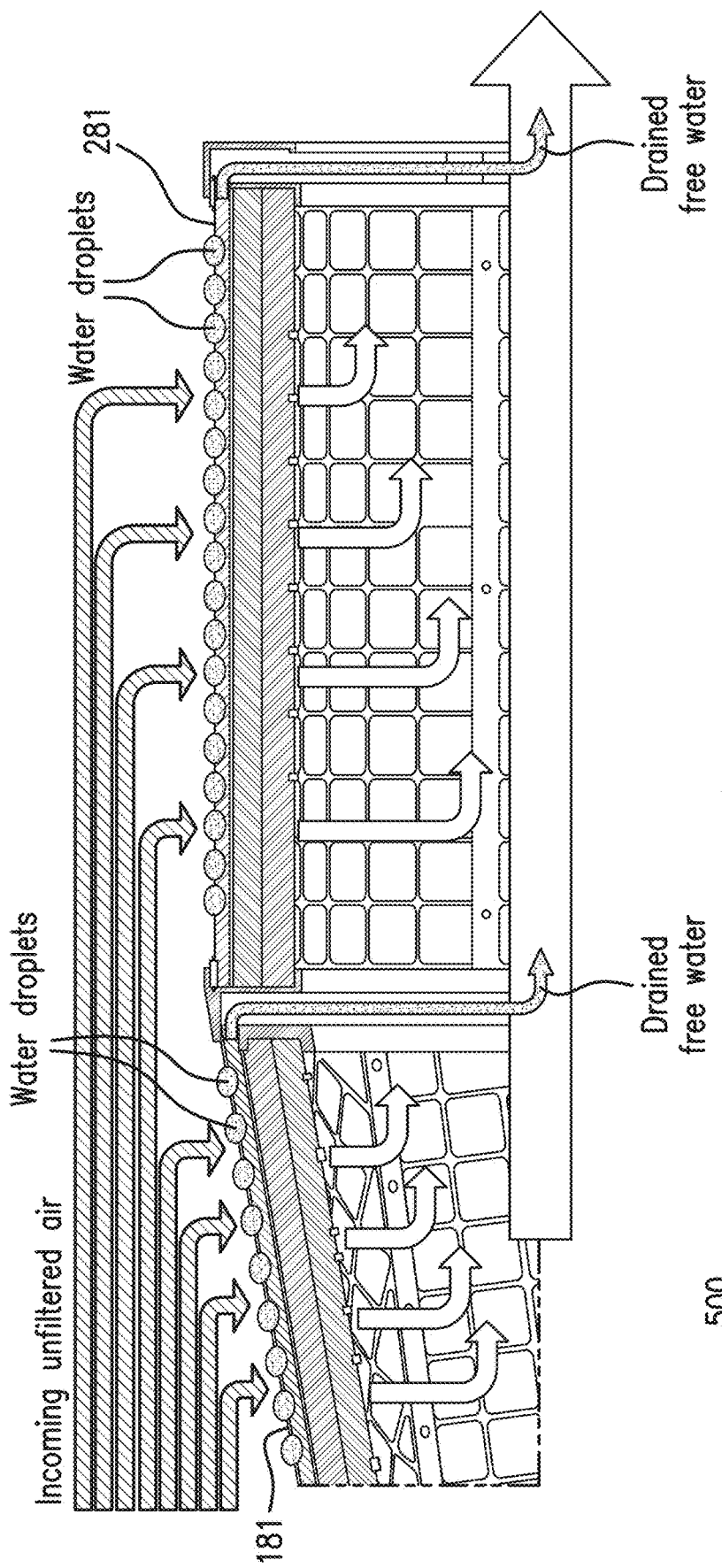

1600

1600

MIST AND VAPOR ELIMINATING FILTER, DEVICE, SYSTEM AND METHOD OF USE

BACKGROUND OF THE INVENTION

There is a need to improve the cabin air quality delivered by the environmental control system (ECS) in an airplane, particularly during ground operation. The present invention provides for ameliorating at least some of the disadvantages of the prior art. These and other advantages of the present invention will be apparent from the description as set forth below.

BRIEF SUMMARY OF THE INVENTION

An aspect of the invention provides a mist and vapor eliminating filter comprising a first stage hollow filter and a second stage hollow filter; (a) the first stage hollow filter comprising a first housing having a first housing first end and a first housing second end; and, arranged in the first housing: (i) a first adsorption element comprising activated carbon and/or activated clay; and, (ii) a first hydrophobic pleated hollow porous medium surrounding the first adsorption element; the first stage hollow filter including a first end cap connected to the first housing first end; (b) the second stage hollow filter comprising a second housing having second housing first end and a second housing second end; and, arranged in the second housing: (iii) a second adsorption element comprising activated carbon and/or activated clay; (iv) a second hydrophobic pleated hollow porous medium surrounding the second adsorption element; the second stage hollow filter including a second end cap connected to the second housing second end; (c) wherein the first housing second end is connected to the second housing first end by an intermediate end cap; the intermediate end cap including a first drain channel between the first housing second end and the second housing first end; and, the second end cap including a second drain channel at the second housing second end.

Another aspect of the invention provides a mist and vapor eliminating filter device comprising (a) a main housing including a main housing body, an inlet duct connected to a first end of the main housing body, and an outlet duct connected to a second end of the main housing body; and, (b) an aspect of the mist and vapor eliminating filter arranged in the main housing between the inlet duct and the outlet duct.

In yet another aspect of the invention, a method of filtering aircraft cabin air comprises passing the aircraft air through an aspect of the mist and vapor eliminating filter device.

Another aspect of the invention provides a system for filtering aircraft air comprising: (A) a mist and vapor eliminating filter device comprising a main housing including a main housing body, an inlet duct connected to a first end of the main housing body, and an outlet duct connected to a second end of the main housing body; and, a mist and vapor eliminating (MaVE) filter comprising a first stage filter and a second stage filter; (a) the first stage hollow filter comprising a first housing having a first housing first end and a first housing second end; and, arranged in the first housing: (i) a first adsorption element comprising activated carbon and/or activated clay; and, (ii) a first hydrophobic pleated hollow porous medium surrounding the first adsorption element; the first stage hollow filter including a first end cap connected to the first housing first end; (b) the second stage hollow filter comprising a second housing having second housing first end and a second housing second end; and, arranged in the second housing: (iii) a second adsorption element comprising activated carbon and/or activated clay; (iv) a second hydrophobic pleated hollow porous medium surrounding the second adsorption element; the second stage hollow filter including a second end cap connected to the second housing second end; wherein the first housing second end is connected to the second housing first end by an intermediate end cap; the intermediate end cap including a first drain channel between the first housing second end and the second housing first end; and, the second end cap including a second drain channel at the second housing second end; wherein the mist and vapor eliminating filter device is arranged in the main housing between the inlet duct and the outlet duct; the system further comprising (B) a bypass valve including a pivotable bypass plate, arranged in a hollow sleeve, wherein the hollow sleeve is arranged between the main housing body and the outlet duct, the hollow sleeve providing an aircraft air flow path through the MaVE filter device partially bypassing the MaVE filter when the bypass valve is opened.

Another aspect of the invention provides a method of filtering aircraft cabin air, the method comprising passing the aircraft air through an aspect of a system for filtering aircraft air comprising: (A) a mist and vapor eliminating filter device comprising a main housing including a main housing body, an inlet duct connected to a first end of the main housing body, and an outlet duct connected to a second end of the main housing body; and, a mist and vapor eliminating (MaVE) filter comprising a first stage filter and a second stage filter; (a) the first stage hollow filter comprising a first housing having a first housing first end and a first housing second end; and, arranged in the first housing: (i) a first adsorption element comprising activated carbon and/or activated clay; and, (ii) a first hydrophobic pleated hollow porous medium surrounding the first adsorption element; the first stage hollow filter including a first end cap connected to the first housing first end; (b) the second stage hollow filter comprising a second housing having second housing first end and a second housing second end; and, arranged in the second housing: (iii) a second adsorption element comprising activated carbon and/or activated clay; (iv) a second hydrophobic pleated hollow porous medium surrounding the second adsorption element; the second stage hollow filter including a second end cap connected to the second housing second end; wherein the first housing second end is connected to the second housing first end by an intermediate end cap; the intermediate end cap including a first drain channel between the first housing second end and the second housing first end; and, the second end cap including a second drain channel at the second housing second end; wherein the mist and vapor eliminating filter device is arranged in the main housing between the inlet duct and the outlet duct; the system further comprising (B) a bypass valve including a pivotable bypass plate, arranged in a hollow sleeve, wherein the hollow sleeve is arranged between the main housing body and the outlet duct, the hollow sleeve providing an aircraft air flow path through the MaVE filter device partially bypassing the MaVE filter when the bypass valve is opened; opening the bypass valve; and flowing aircraft air through the MaVE filter device while partially bypassing the MaVE filter. Preferably, the method also includes comprising closing the bypass valve and flowing aircraft air through the MaVE filter.

In another aspect, a method of filtering aircraft cabin air comprising passing the aircraft air through an aspect of the mist and vapor eliminating filter device and/or through an aspect of the system also includes collecting free water on an upstream surface of the first hydrophobic pleated hollow porous medium and collecting free water on an upstream surface of the second hydrophobic pleated hollow porous medium. In a preferred aspect, the method includes passing the collected free water on the upstream surface of the first hydrophobic pleated hollow porous medium through the first drain channel, and passing the collected free water on the upstream surface of the second hydrophobic pleated hollow porous medium through the second drain channel.

BRIEF DESCRIPTION OF THE SEVERAL VIEWS OF THE DRAWING(S)

FIG. 1A is a drawing showing a back view of a mist and vapor eliminating (MaVE) filter according to an aspect of the invention, also showing 3 detent arrangements on a second end cap of the filter; FIG. 1B is a drawing showing a cross-sectional view of the MaVE filter along line A-A of FIG. 1A, showing a nose cone connected to a first end cap, a first stage hollow filter and a second stage hollow filter; FIG. 1C is a drawing showing a side view of the MaVE filter shown in FIGS. 1A and 1B; FIG. 1D is a drawing showing a rear isometric view of the MaVE filter shown in FIG. 1C, with a second housing second end and the second end cap removed, showing an open second end of a second hydrophobic pleated hollow porous medium, retained by, but not sealed to, the second end cap; FIG. 1E is a drawing showing an enlarged view of detail C shown in FIG. 1B, illustrating a detent arrangement on the second end cap; FIG. 1F is a drawing showing an enlarged view of detail E shown in FIG. 1B, showing a joining arrangement joining a nose cone of the MaVE filter to a first end cap; FIG. 1G is a drawing showing an enlarged view of detail B in FIG. 1B of a first clip lock joining a second end of the first housing to a second end of a first inner cage of a first stage hollow filter; and a second clip lock joining an intermediate end cap to a first end of a second inner cage of a second stage hollow filter; FIG. 1H is a drawing showing a cross-sectional view of the first stage hollow filter; FIG. 1I is a cross-sectional view of the second stage hollow filter.

FIG. 2A is a rear isometric view, FIG. 2B is a side view.

FIGS. 3A-3C are drawings showing the first end cap, FIG. 3A is a rear isometric view, FIG. 3B is a rear view; FIG. 3C is a side view.

FIG. 4A is a rear isometric view, FIG. 4B is a rear view; FIG. 4C is a side view.

FIGS. 5A-5C are drawings showing the intermediate end cap, FIG. 5A is a rear isometric view, FIG. 5B is a rear view; FIG. 5C is a side view.

FIG. 6A is a rear isometric view, FIG. 6B is a rear view; FIG. 6C is a side view.

FIGS. 7A-7C are drawings showing the second end cap, FIG. 7A is a rear isometric view, FIG. 7B is a rear view; FIG. 7C is a side view.

Figure 1A:
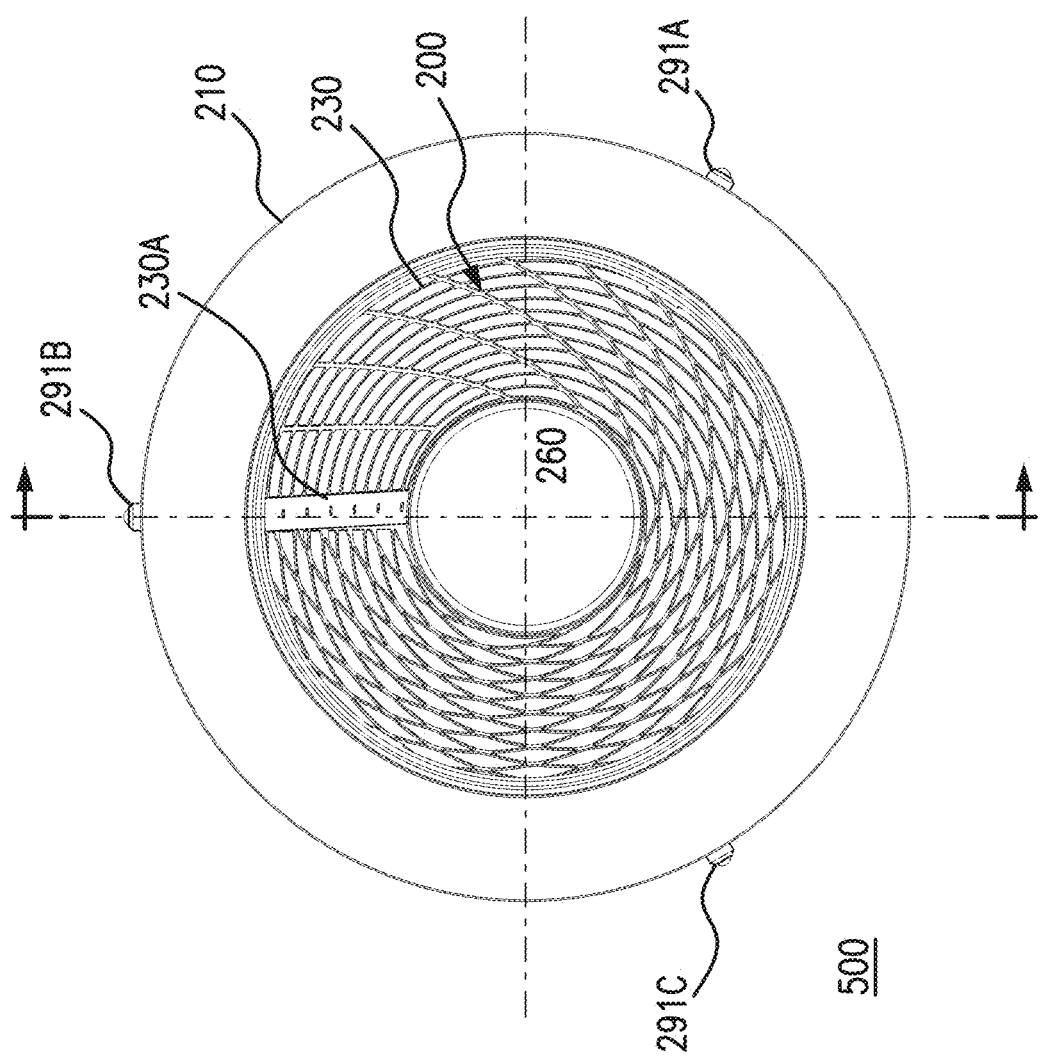
Figure 1B:
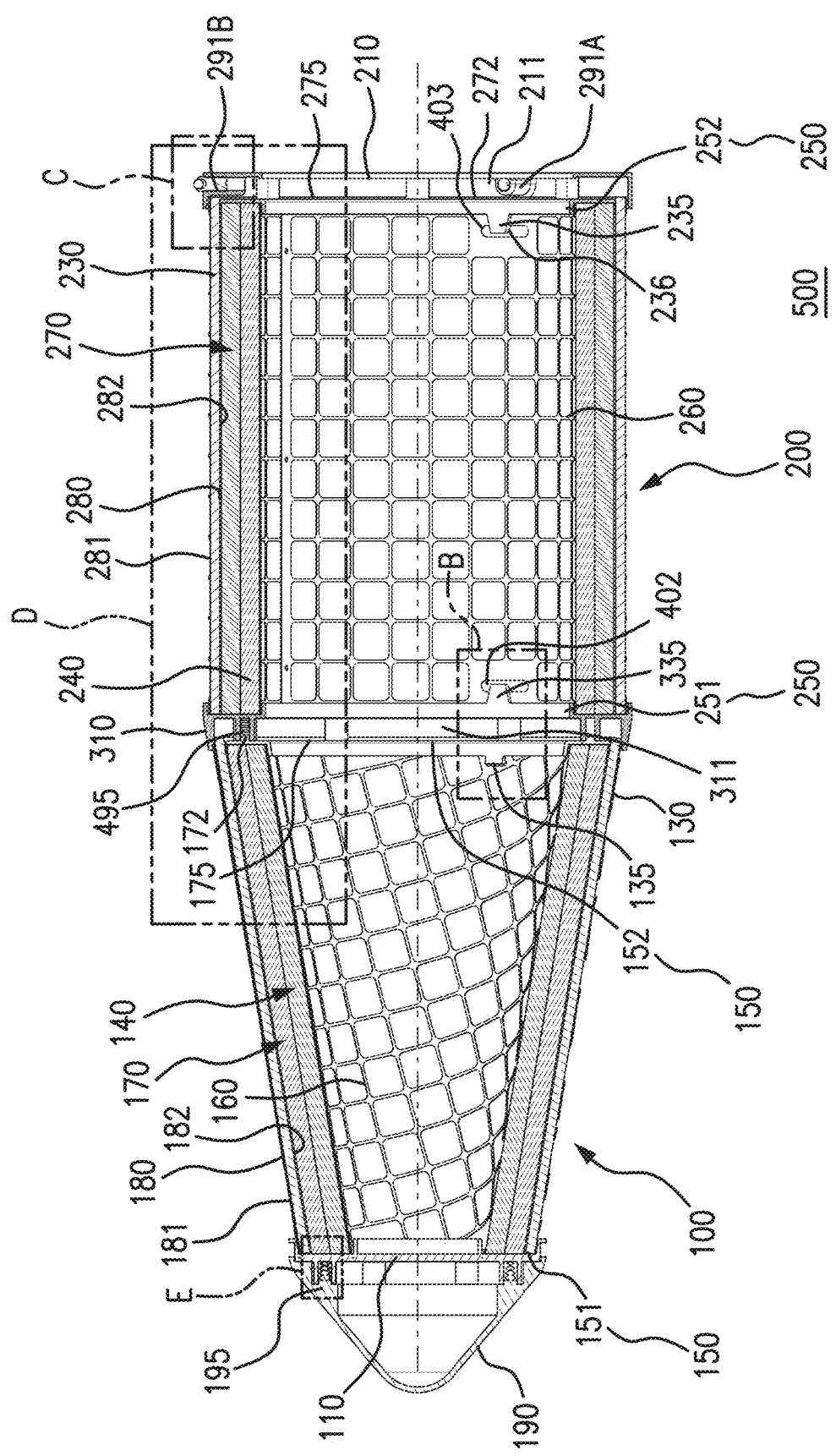
Figure 1C:
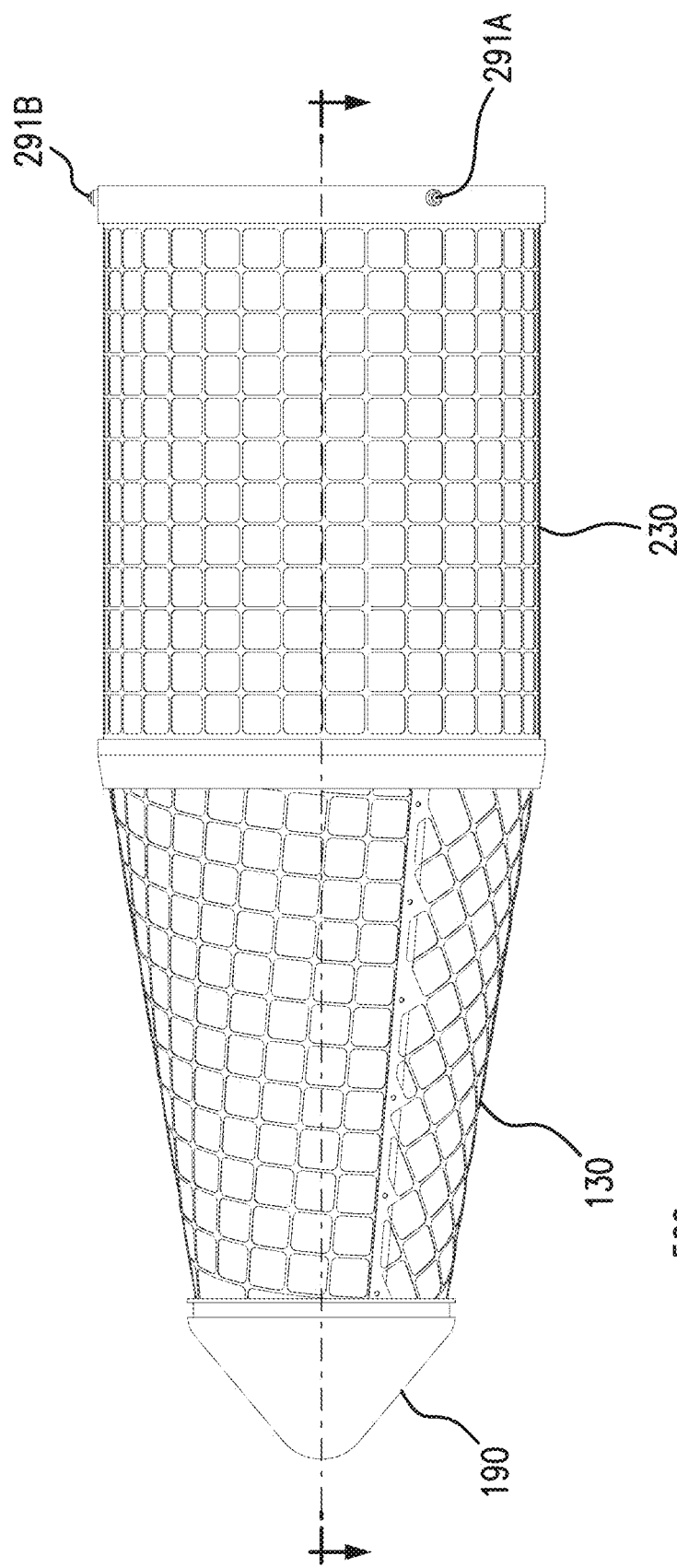
Figure 8A:
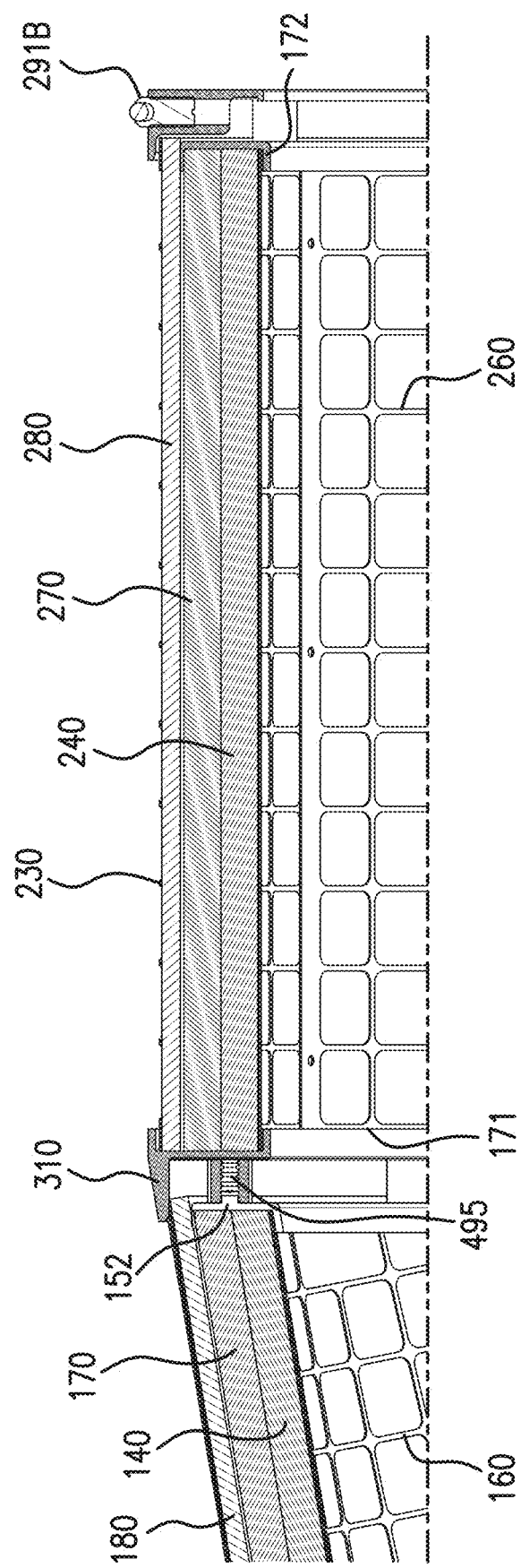

FIG. 8A is a drawing showing an enlarged partial sectional view of an aspect of the MaVE filter shown in detail D of FIG. 1B. FIG. 8B shows a diagrammatic representation of collecting and draining condensed water vapor as aircraft air passes through the mist and vapor eliminating filter device shown in FIGS. 1A and 8A via outside to inside flow, wherein aircraft air, stripped of at least a portion of the mist and vapor initially present by the first and second hydrophobic pleated hollow porous media, passes through first and second adsorption elements, also showing the adsorption elements sealed to end caps, and hydrophobic pleated hollow porous media retained by the end caps.

Figure 9A:
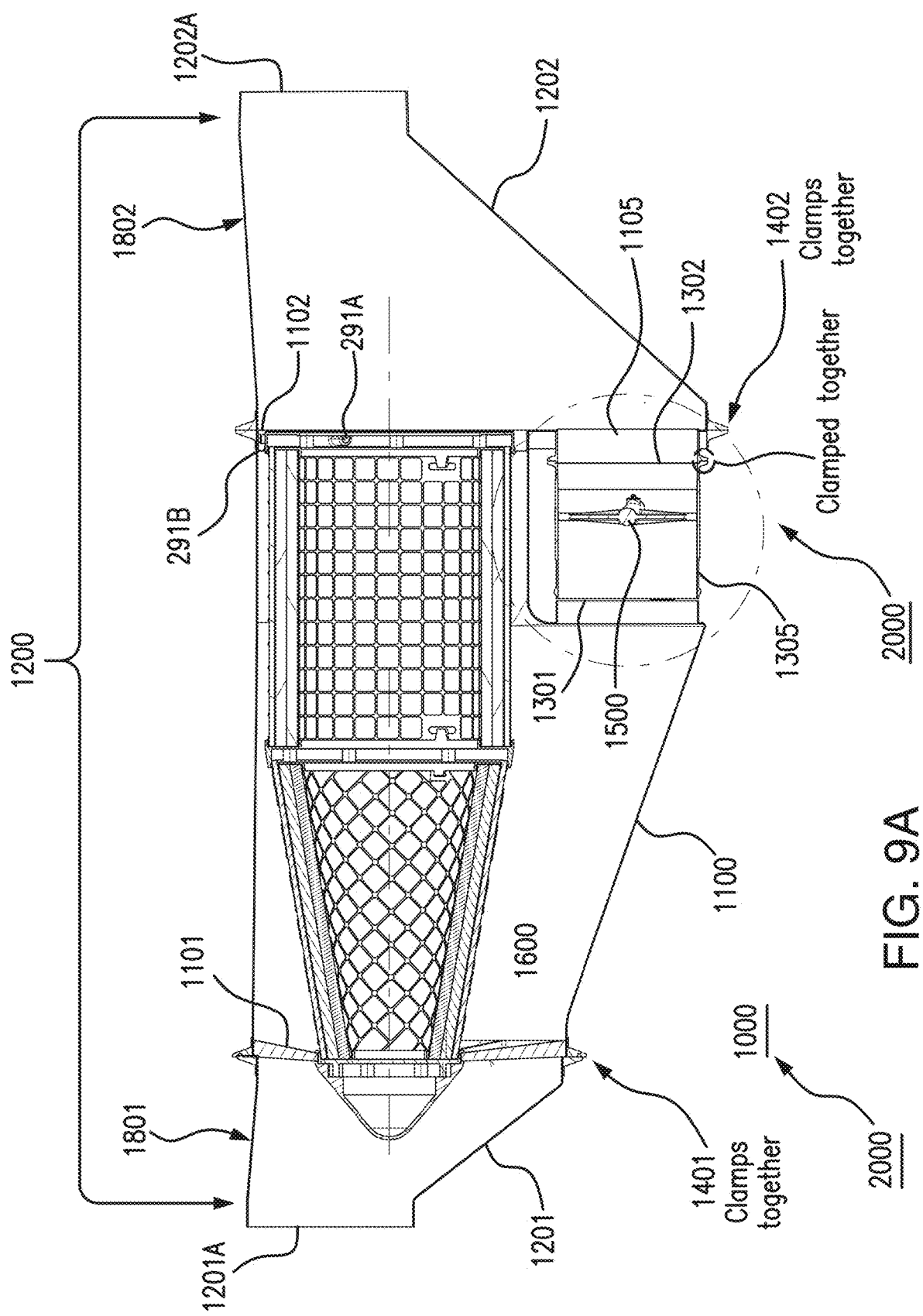
Figure 9B:
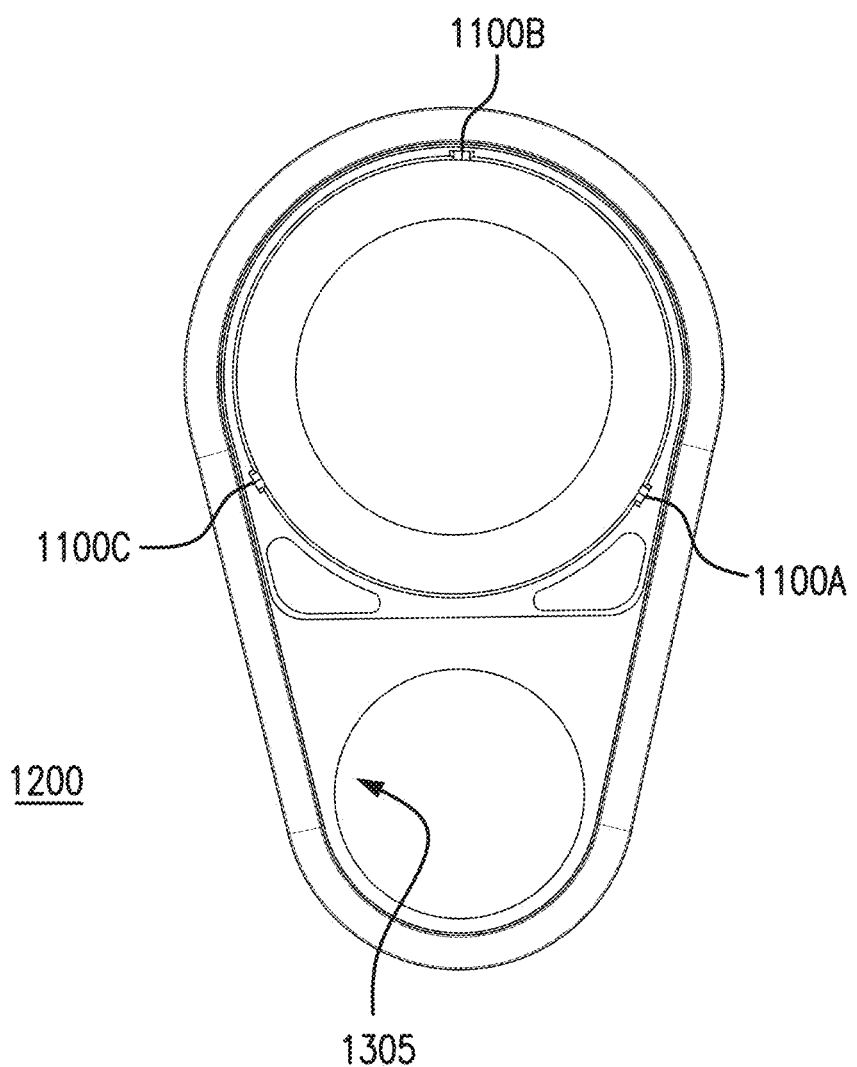
Figure 9C:
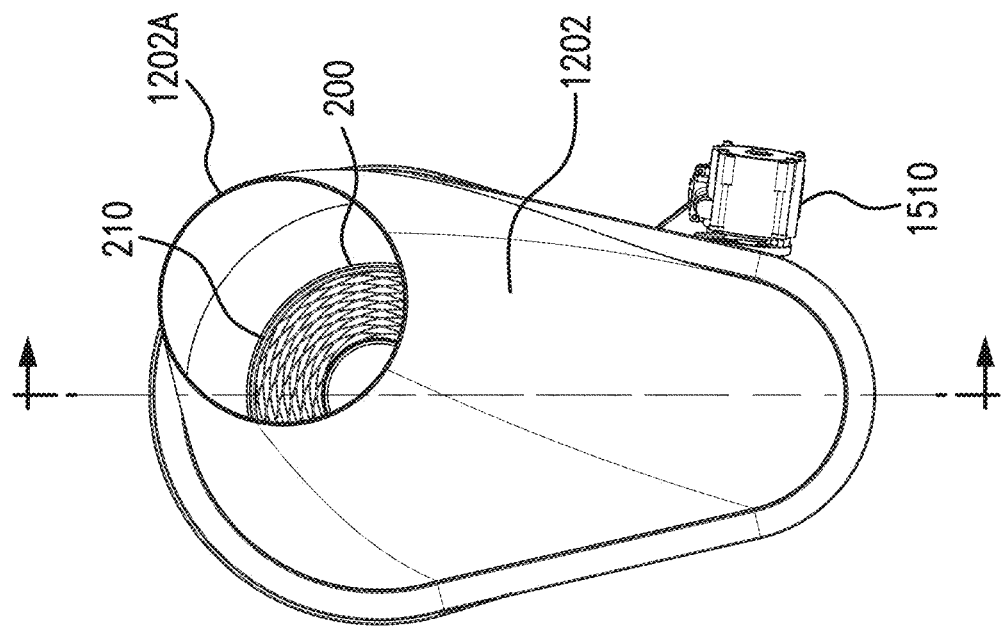
Figure 9D:
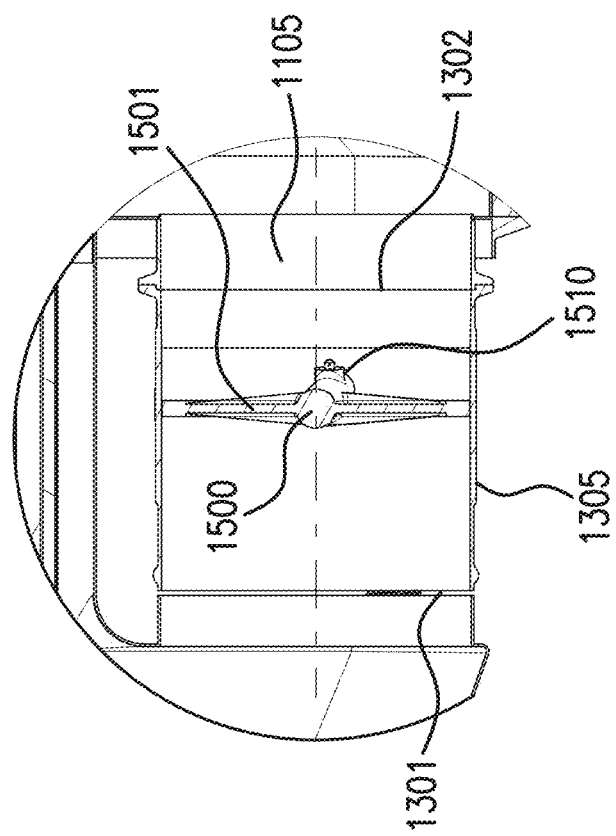
Figure 9E:
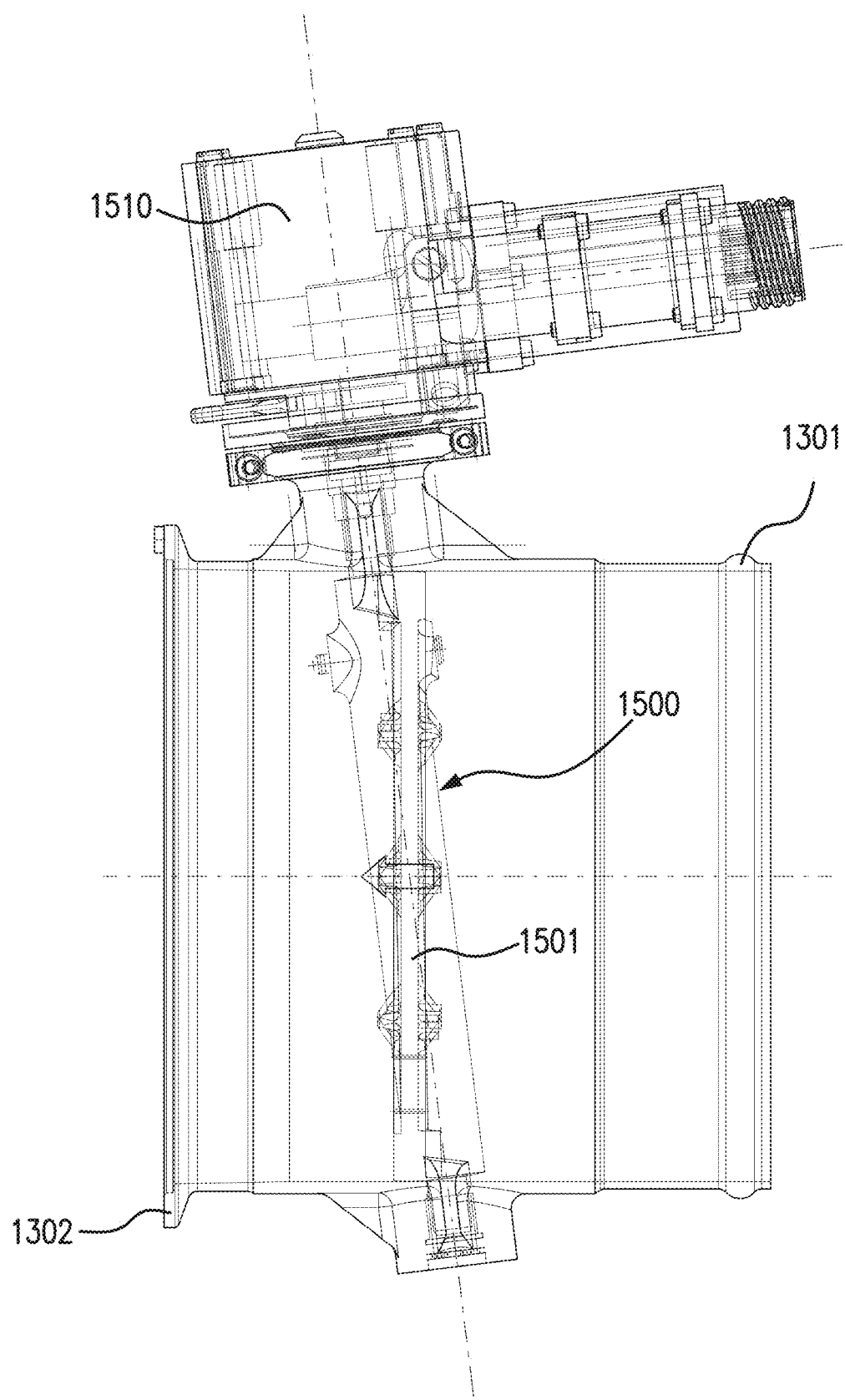
Figure 9F:
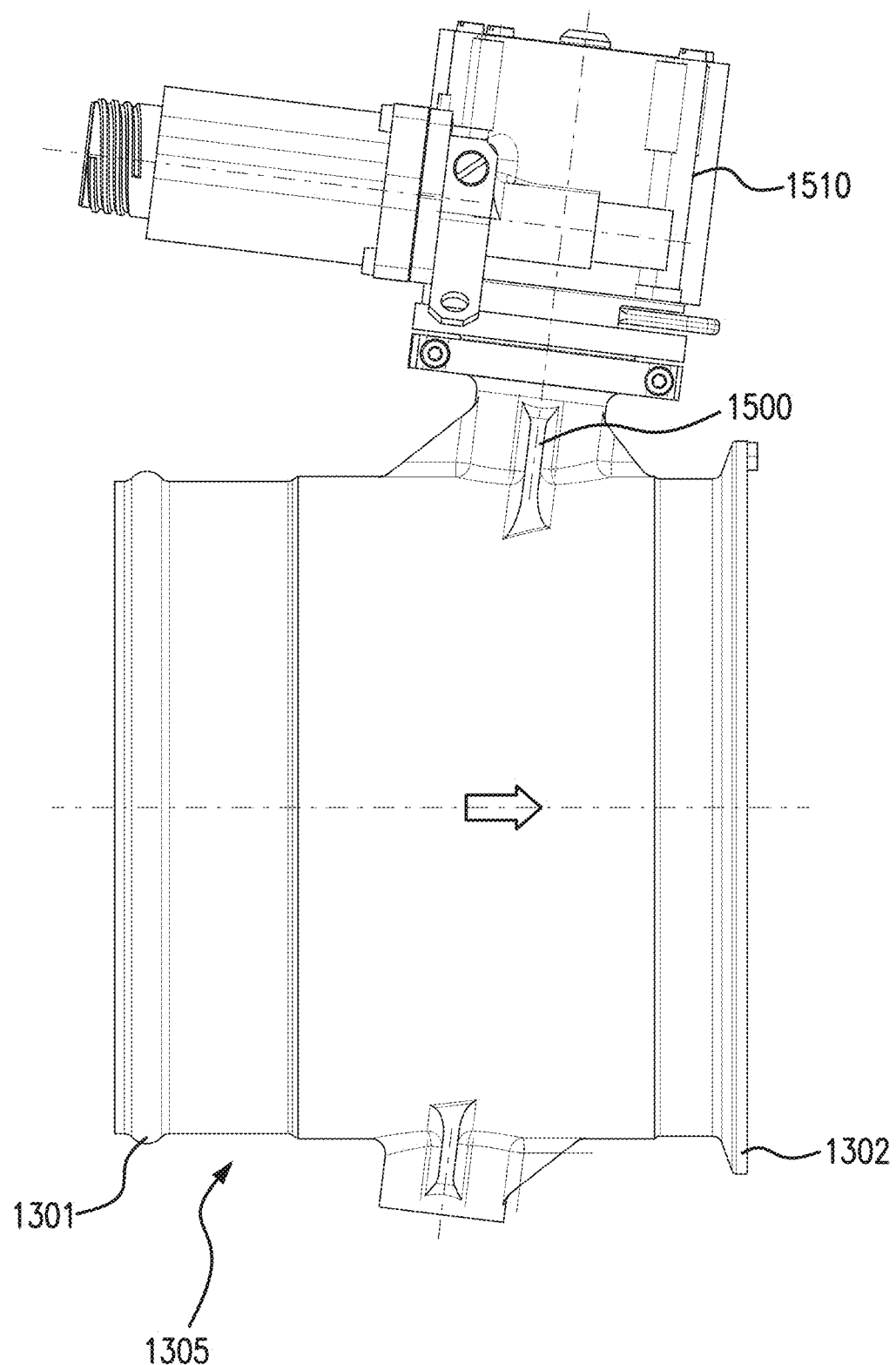
Figure 9G:
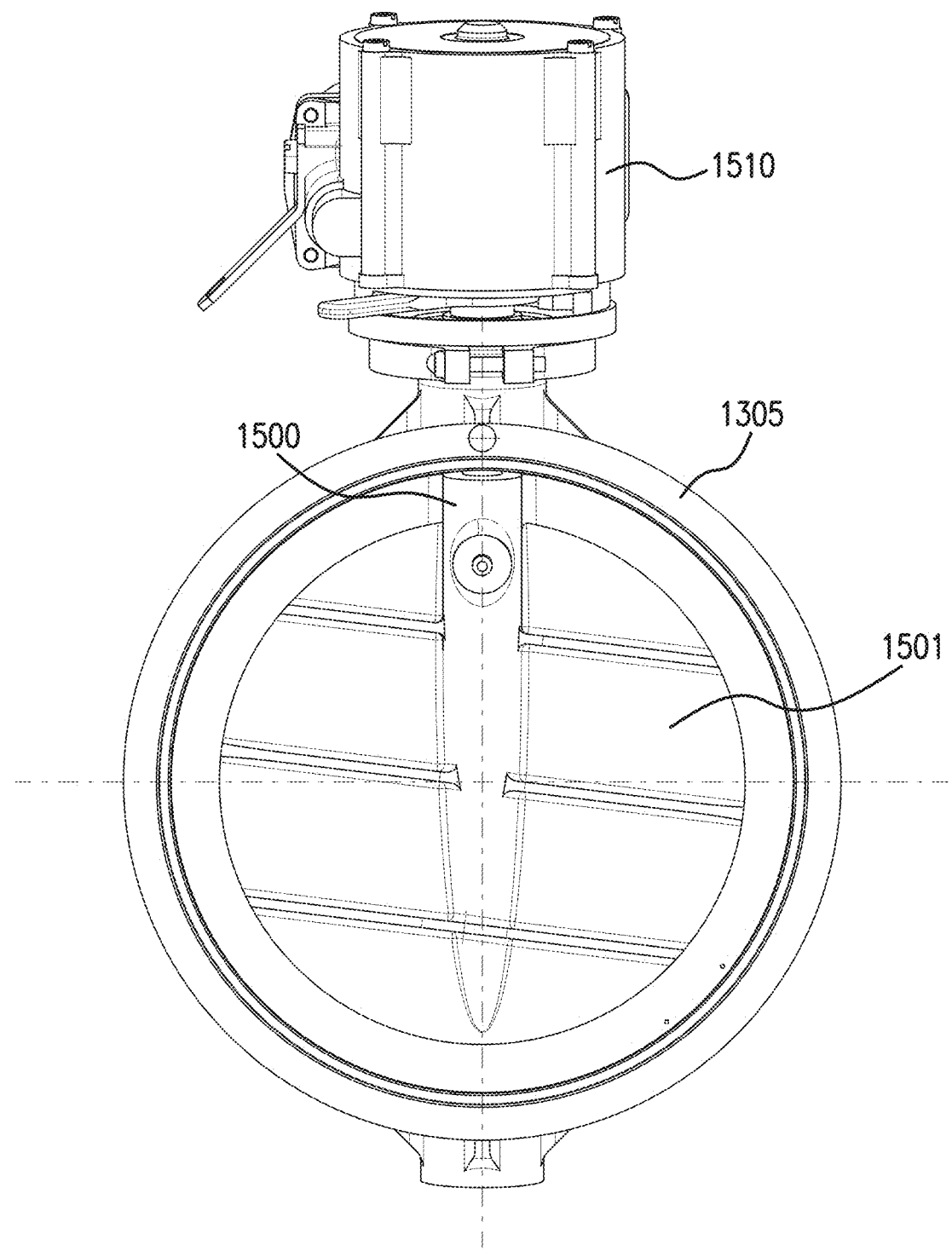
Figure 9H:
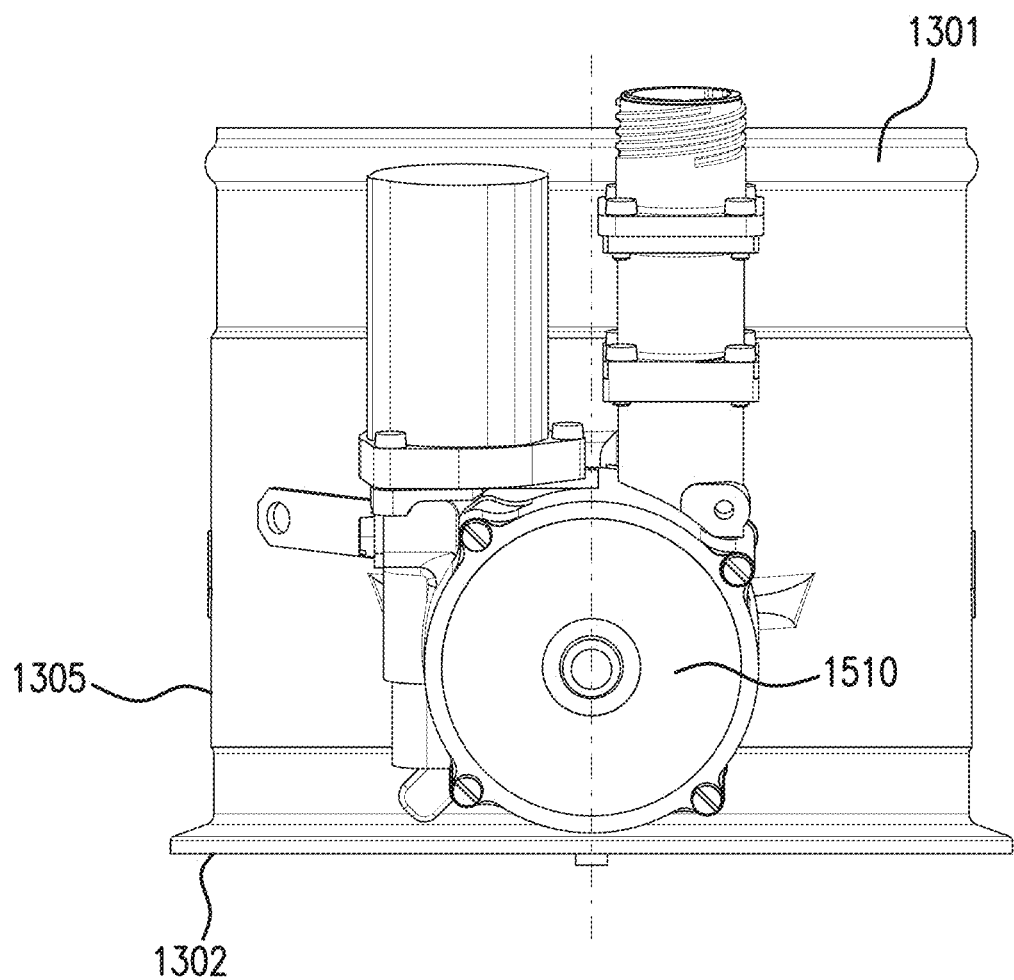
Figure 9I:
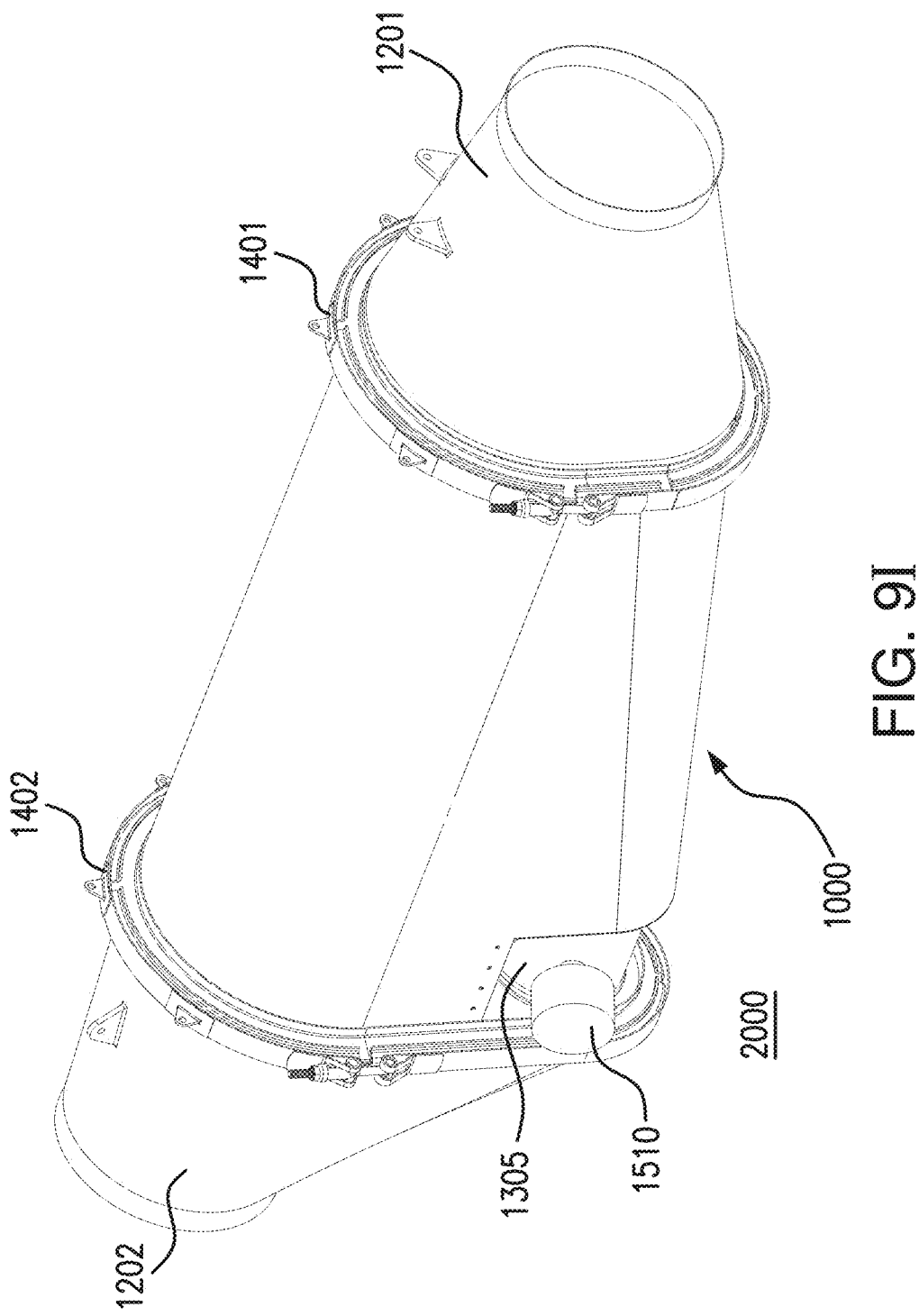
Figure 9K:
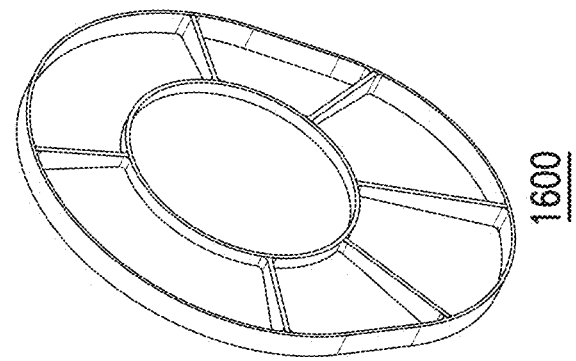
Figure 9J:
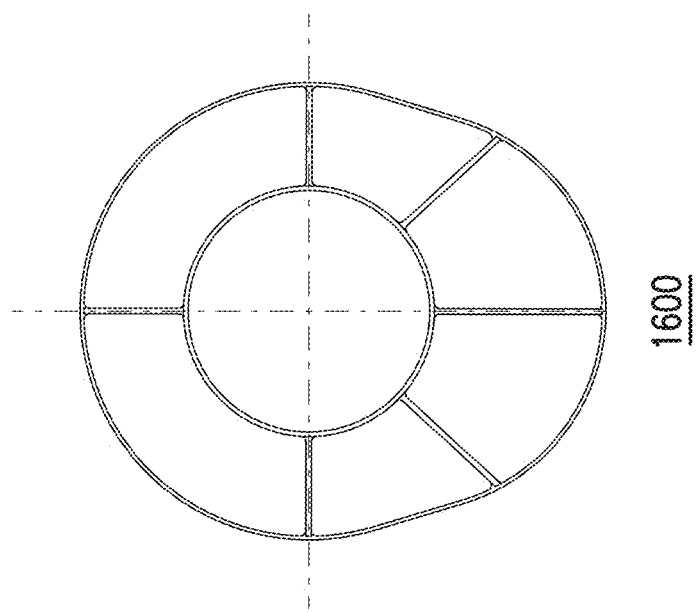
Figure 9L:
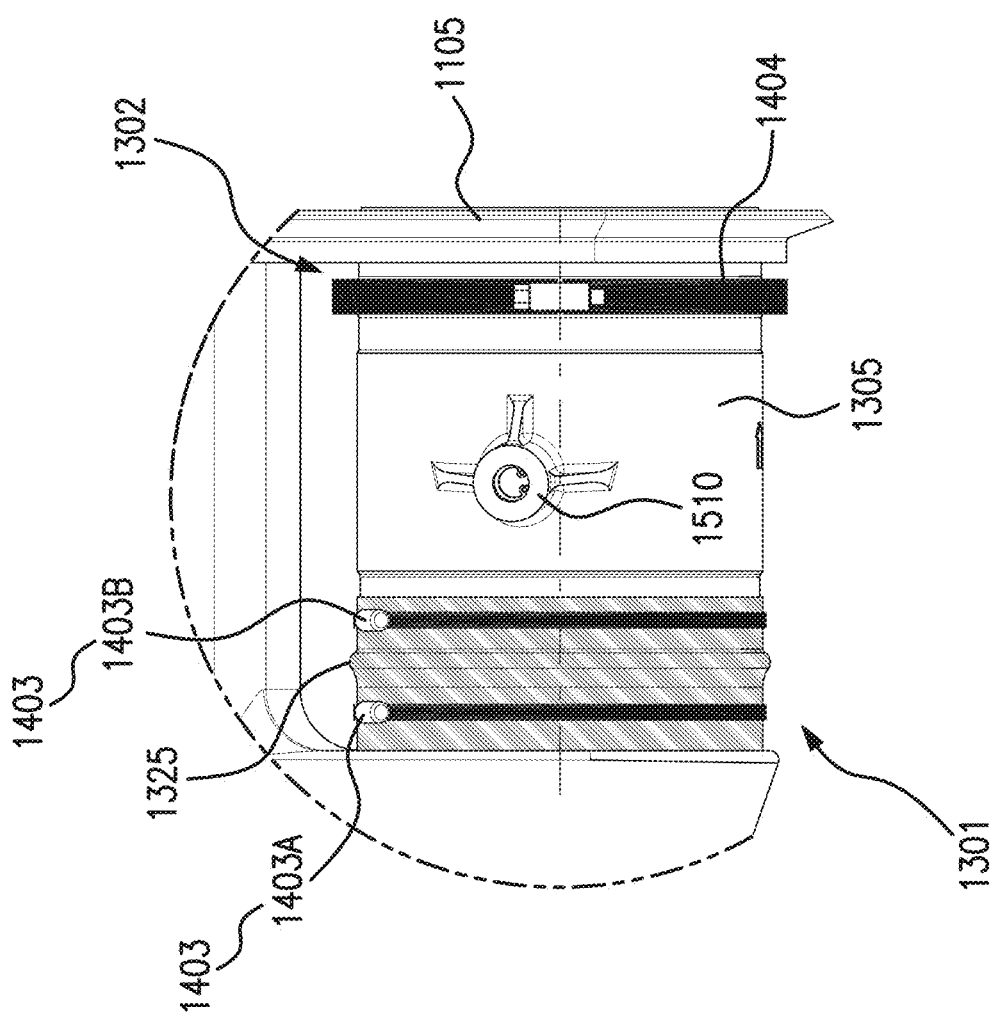
Figure 10:
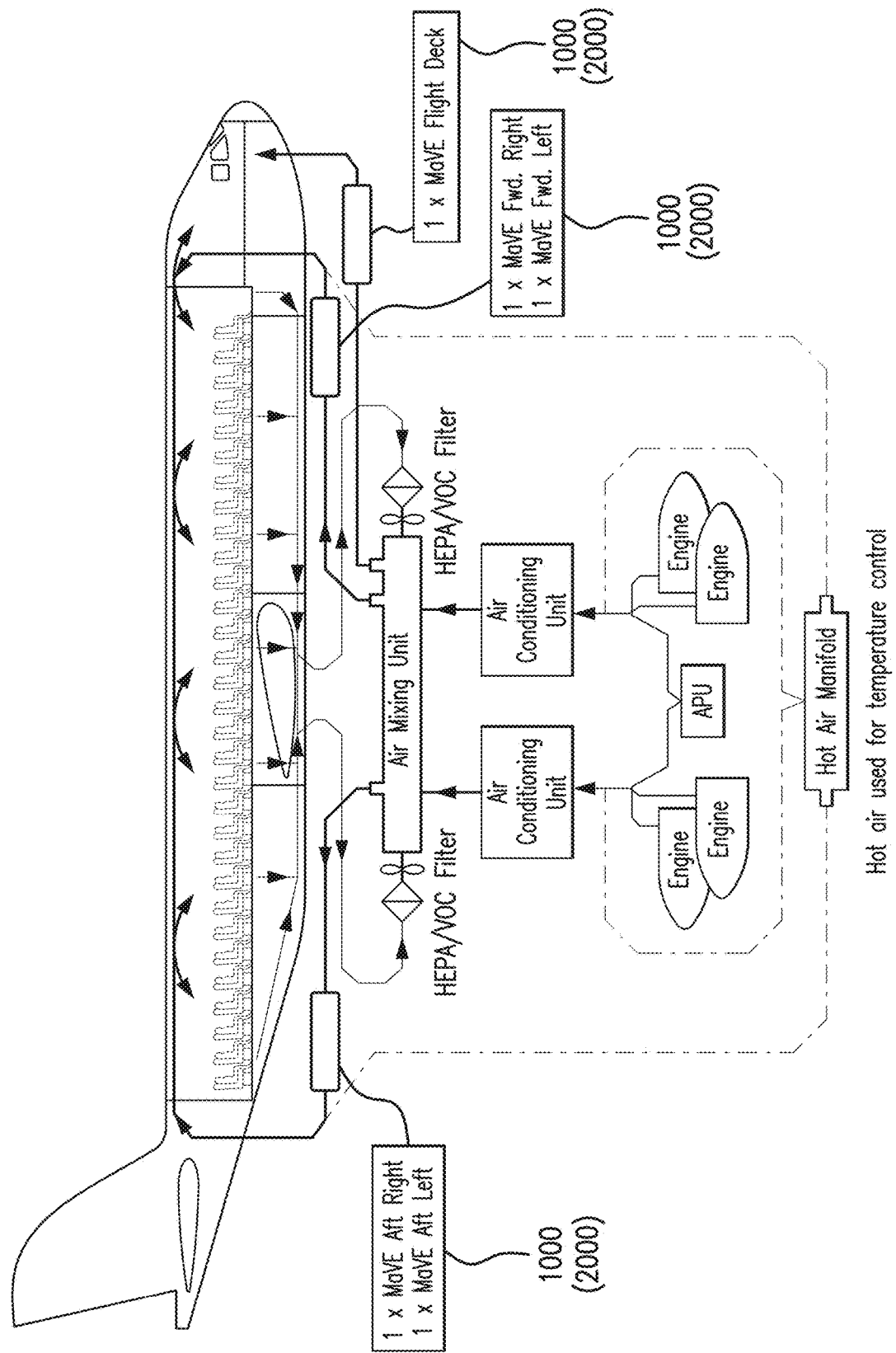

FIG. 9A is a drawing showing a cross-sectional view of a system for filtering aircraft air including a MaVE filter device according to an aspect of the invention, including the MaVE filter shown in FIG. 1A arranged in a main housing including a main housing body, an inlet duct connected to a first end of the main housing body by a first clamping arrangement, an outlet duct connected to a second end of the main housing body by a second clamping arrangement, and a bypass valve in a sleeve arranged between the main housing body and the outlet duct, for providing an aircraft air flow path through the MaVE filter device partially bypassing the MaVE filter, also showing sensors arranged upstream and downstream of the MaVE filter; FIG. 9B is a drawing showing a front view of the main housing body shown in FIG. 9A, also showing cavities for receiving detent arrangements on a second end cap on the MaVE filter (detail C in FIG. 1B) such that the filter can be locked in position in the main housing; FIG. 9C is a drawing showing a front view of the MaVE filter device shown in FIG. 9A, showing the outlet duct port offset from the second end of the second stage hollow filter, also showing a bypass valve actuator, FIG. 9D is a drawing showing an enlarged view of detail B shown in FIG. 9A, illustrating a sleeve containing the bypass valve; FIG. 9E is a drawing showing a cross-sectional view of the right side of the sleeve containing the bypass valve and bypass valve plate, and the bypass valve actuator attached to the bypass valve, also including a centrally arranged arrow showing the direction of air flow through the sleeve and bypass valve when the valve is open (also showing the valve shaft arranged at an angle and the valve plate vertically arranged in the sleeve); FIG. 9F is a drawing showing the left side of the sleeve and bypass valve actuator shown in FIG. 9E including an arrow showing the direction of air flow through the sleeve and bypass valve when the valve is open; FIG. 9G is a front view of the sleeve containing the bypass valve and bypass valve plate, and the bypass valve actuator attached to the bypass valve shown in FIG. 9F; FIG. 9H is a top view of the bypass actuator and sleeve shown in FIG. 9F; FIG. 9I is a drawing showing an isometric rear view of the MaVE filter device shown in FIG. 9A, FIGS. 9J and 9K are, respectively, drawings of the front, and rear perspective views of the spider plate, and FIG. 9L is a drawing showing a modified view of detail B shown in 9A, FIG. 10 is a drawing showing a diagrammatic representation of the environmental control system (ECS) showing how the fresh aircraft and recirculated air passes through an air mixing unit and mist and vapor eliminating (MaVE) filter devices and subsequently through the aircraft, including filtering the recirculated air through high efficiency particulate air/volatile organic compound (HEPA/VOC) filters.

Figure 11:
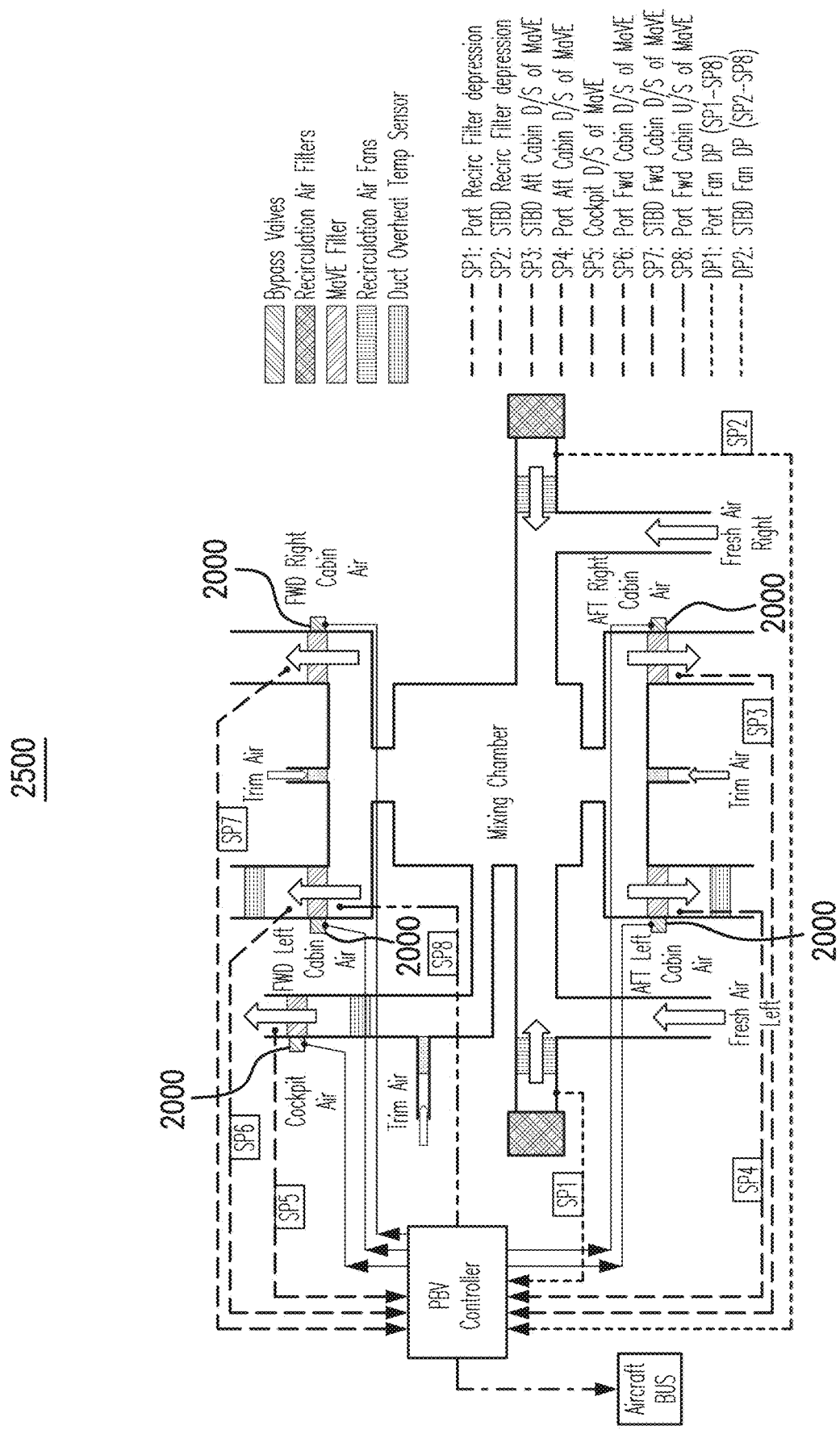

FIG. 11 is a drawing showing an exemplary diagrammatic representation of a control system for controlling flow of the bypass valves in systems for filtering aircraft air including MaVE filter devices according to an aspect of the invention

DETAILED DESCRIPTION OF THE INVENTION

Figure 4C:
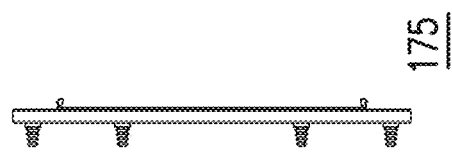
FIGS. 4A-4C are drawings showing a first adsorption element end cap.
Figure 4A:
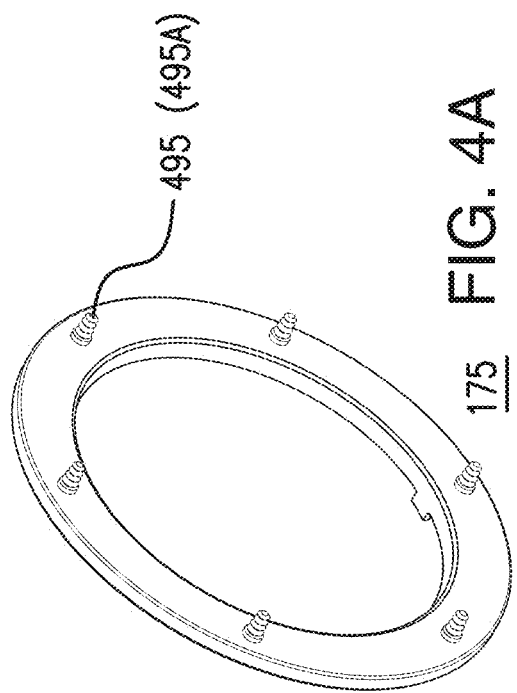
Figure 4B:
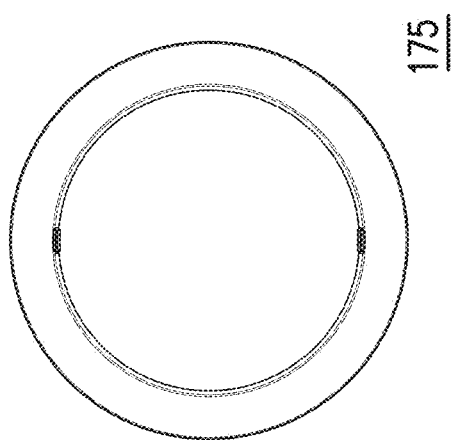

In ECS systems, both fresh and recirculated (filtered through a high efficiency particulate air/volatile organic compound (HEPA/VOC) filter) air is distributed through the aircraft cabin in varying proportions depending on the aircraft type, typically, approximately 50% to 60% fresh air, and approximately 40%-50% filtered recirculated air. The fresh air is delivered to the ECS from either the engines or auxiliary power unit (APU) through two air conditioning packs that regulate air pressure and temperature (see, FIG. 4). During certain outside air conditions (for example, ground operations), the air conditioning packs condense water vapor present in the air as free water in the form of a mist. Without the ability to handle the free water content, the free water can adversely impact the efficiency of the VOC filter through wetting, which can lead to bacterial growth and introduce unpleasant odors into the cabin, or increase the pressure loss across the pleated filter medium/media.

Advantageously, aspects of the mist and vapor eliminator (MaVE) filter(s) according to the invention strip the free water (e.g., in the form of a mist) from the cabin air, preventing it from wetting the adsorption element and reducing VOC performance (see, FIG. 4, showing aspects of the invention combined with a conventional ECS system). Moreover, managing the flow of free water minimizes an increase in differential pressure, thus reducing or avoiding the possible negative impact on the ECS's ability to maintain the required levels of ventilation air flow. In another advantage, the stripped free water/water droplets can be reintroduced to the airflow downstream of the MaVE filter, maintaining the evaporative cooling function of the ECS.

An aspect of the invention provides a MaVE filter comprising a first stage hollow filter and a second stage hollow filter; (a) the first stage hollow filter comprising a first housing having a first housing first end and a first housing second end; and, arranged in the first housing: (i) a first adsorption element comprising activated carbon and/or activated clay; and, (ii) a first hydrophobic pleated hollow porous medium surrounding the first adsorption element; the first stage hollow filter including a first end cap connected to the first housing first end; (b) the second stage hollow filter comprising a second housing having second housing first end and a second housing second end; and, arranged in the second housing: (iii) a second adsorption element comprising activated carbon and/or activated clay; (iv) a second hydrophobic pleated hollow porous medium surrounding the second adsorption element; the second stage hollow filter including a second end cap connected to the second housing second end; (c) wherein the first housing second end is connected to the second housing first end by an intermediate end cap; the intermediate end cap including a first drain channel between the first housing second end and the second housing first end; and, the second end cap including a second drain channel at the second housing second end.

In an aspect of the MaVE filter, the first adsorption element and the first hydrophobic pleated hollow porous medium each have a tapered configuration.

In a preferred aspect of the MaVE filter, the filter further comprises a first adsorption element end cap, sealed to an end of the first adsorption element, the first adsorption element end cap contacting the intermediate end cap; and a second adsorption element end cap, sealed to an end of the second adsorption element, the second adsorption element end cap contacting the second end cap.

In a typical aspect of the MaVE filter, the first hydrophobic pleated hollow porous medium is retained by the intermediate end cap, and the second hydrophobic pleated hollow porous medium is retained by the end cap.

In another aspect of the MaVE filter, the intermediate end cap provides a drain gap in the range of from 6 mm to 18 mm for the first drain channel, and the second end cap provides a drain gap in the range of from 6 mm to 18 mm for the second drain channel.

In a preferred aspect of the MaVE filter, the first and second stage filters each include respective first and second outer cages and respective first and second inner cores, and in some aspects, the first and second stage filters each further include respective perforated cages arranged between the adsorption elements and the inner cores.

Typically, the MaVE filter includes at least two joining arrangements connecting the first housing second end to the intermediate end cap, and at least two additional joining arrangements connecting the second housing second end to the second end cap.

Another aspect of the invention provides a mist and vapor eliminating filter device comprising (a) a main housing including a main housing body, an inlet duct connected to a first end of the main housing body, and an outlet duct connected to a second end of the main housing body; and, (b) an aspect of the mist and vapor eliminating filter arranged in the main housing between the inlet duct and the outlet duct.

In yet another aspect of the invention, a method of filtering aircraft cabin air comprises passing the aircraft air through an aspect of the mist and vapor eliminating filter device and/or passing the aircraft air through an aspect of the system for filtering aircraft air. In an aspect, the method also includes collecting free water on an upstream surface of the first hydrophobic pleated hollow porous medium and collecting free water on an upstream surface of the second hydrophobic pleated hollow porous medium. In a preferred aspect, the method includes passing the collected free water on the upstream surface of the first hydrophobic pleated hollow porous medium through the first drain channel, and passing the collected free water on the upstream surface of the second hydrophobic pleated hollow porous medium through the second drain channel.

In one aspect, the method further includes passing water along the drain channels and reintroducing the suspended free water back into the downstream ventilation air flow, thereby allowing the water to re-evaporate as the air flow progresses along the ventilation ducting. The stripped water travels along the top surface of the membrane (propelled by the flow of air along the filter) to the water drain channels, where the water bypasses the MaVE filter, to be re-entrained into the downstream airflow. Once re-entrained, the free water, in the form of droplets, is then able to evaporate as it travels in the airflow along the ventilation ducting, enabling the system to continue to capitalize on this additional evaporative cooling effect.

Illustratively, with respect to additional evaporative cooling, a volume of free water droplets is re-evaporated, such that energy, in the form of heat, is essentially transferred from the air (sensible heat) to the water droplets (latent heat) through evaporation. This can be provided by mixing of the cold air from delivered by the air-conditioning pack, which contains the free water, with the warmer recirculated air. The level of cooling delivered (defined in KW) is dependent on the specific environmental conditions of the day and the target condition to be achieved in the aircraft. For example, if a free water content of 1 g of water per 1 Kg of air was delivered by the air conditional pack, the additional cooling effect achieved could deliver as much as 1.7 KW of additional cooling.

In another aspect of the invention, a system for filtering aircraft air is provided, the system including an aspect of the MaVE filter device, and further comprising a bypass valve including a pivotable bypass plate, arranged in a hollow sleeve, wherein the hollow sleeve is arranged between the main housing body and the outlet duct, the hollow sleeve providing an aircraft air flow path through the MaVE filter device partially bypassing the MaVE filter when the bypass valve is opened.

In an aspect of the system, the first adsorption element and the first hydrophobic pleated hollow porous medium each have a tapered configuration. Alternatively, or additionally, aspects of the system include any one or more of the following: the MaVE filter further comprises a first adsorption element end cap, sealed to an end of the first adsorption element, the first adsorption element end cap contacting the intermediate end cap, and a second adsorption element end cap, sealed to an end of the second adsorption element, the second adsorption element end cap contacting the second end cap; the first hydrophobic pleated hollow porous medium is retained by the intermediate end cap, and the second hydrophobic pleated hollow porous medium is retained by the end cap; the intermediate end cap provides a drain gap in the range of from 6 mm to 18 mm for the first drain channel, and the second end cap provides a drain gap in the range of from 6 mm to 18 mm for the second drain channel; the MaVE filter includes at least two joining arrangements connecting the first housing second end to the intermediate end cap, and at least two additional joining arrangements connecting the second housing second end to the second end cap; the first stage hollow filter includes a first stage outer cage and a first stage inner core; and, the second stage hollow filter includes a second stage outer cage and a second stage inner core.

Another aspect of the invention provides a method of filtering aircraft cabin air, the method comprising passing the aircraft air through an aspect of a system for filtering aircraft air comprising: (A) a mist and vapor eliminating filter device comprising a main housing including a main housing body, an inlet duct connected to a first end of the main housing body, and an outlet duct connected to a second end of the main housing body; and, a mist and vapor eliminating (MaVE) filter comprising a first stage filter and a second stage filter; (a) the first stage hollow filter comprising a first housing having a first housing first end and a first housing second end; and, arranged in the first housing: (i) a first adsorption element comprising activated carbon and/or activated clay; and, (ii) a first hydrophobic pleated hollow porous medium surrounding the first adsorption element; the first stage hollow filter including a first end cap connected to the first housing first end; (b) the second stage hollow filter comprising a second housing having second housing first end and a second housing second end; and, arranged in the second housing: (iii) a second adsorption element comprising activated carbon and/or activated clay; (iv) a second hydrophobic pleated hollow porous medium surrounding the second adsorption element; the second stage hollow filter including a second end cap connected to the second housing second end; wherein the first housing second end is connected to the second housing first end by an intermediate end cap; the intermediate end cap including a first drain channel between the first housing second end and the second housing first end; and, the second end cap including a second drain channel at the second housing second end; wherein the mist and vapor eliminating filter device is arranged in the main housing between the inlet duct and the outlet duct; the system further comprising (B) a bypass valve including a pivotable bypass plate, arranged in a hollow sleeve, wherein the hollow sleeve is arranged between the main housing body and the outlet duct, the hollow sleeve providing an aircraft air flow path through the MaVE filter device partially bypassing the MaVE filter when the bypass valve is opened; opening the bypass valve; and flowing aircraft air through the MaVE filter device while partially bypassing the MaVE filter. Preferably, the method also includes comprising closing the bypass valve and flowing aircraft air through the MaVE filter.

In some aspects, the method includes repeatedly alternating between closing the bypass valve and flowing aircraft air through the MaVE filter, and opening the bypass valve; and flowing aircraft air through the MaVE filter device while partially bypassing the MaVE filter.

Aspects of filtering aircraft cabin air through an aspect of the system can include collecting free water on an upstream surface of the first hydrophobic pleated hollow porous medium and collecting free water on an upstream surface of the second hydrophobic pleated hollow porous medium; and can further include passing the collected free water on the upstream surface of the first hydrophobic pleated hollow porous medium through the first drain channel, and passing the collected free water on the upstream surface of the second hydrophobic pleated hollow porous medium through the second drain channel.

Each of the components of the invention will now be described in more detail below, wherein like components have like reference numbers.

The aspect of the MaVE filter 500 according to the invention shown in FIGS. 1A-1I comprises a first stage hollow filter 100 and a second stage hollow filter 200; the first stage hollow filter comprising a first housing 150 having a first housing first end 151 and a first housing second end 152 including an first housing second end plate 152A; and, arranged in the first housing: a first adsorption element 170 comprising activated carbon and/or activated clay; and, a first hydrophobic pleated hollow porous medium 180 surrounding the first adsorption element, the first hydrophobic pleated hollow porous medium 180 having an upstream surface 181 and a downstream surface 182; the first stage filter including a first end cap 110 connected to the first housing first end; the second stage hollow filter comprising a second housing 250 having second housing first end 251 and a second housing second end 252; and, arranged in the second housing: a second adsorption element 270 comprising activated carbon and/or activated clay; a second hydrophobic pleated hollow porous medium 280 surrounding the second adsorption element, the second hydrophobic pleated hollow porous medium 280 having an upstream surface 281 and a downstream surface 282; the second stage hollow filter including a second end cap 210 connected to the second housing second end by a joining arrangement 496 (FIG. 1I); wherein the first housing second end is connected to the second housing first end by an intermediate end cap 310, wherein the first housing second end is connected to the intermediate end cap by a joining arrangement 495; the intermediate end cap including a first drain channel 311 between the first housing second end and the second housing first end; and, the second end cap including a second drain channel 211 at the second housing second end.

The hydrophobic pleated hollow porous media 180, 280 provide for collecting and draining condensed water vapor on the upstream surfaces of the media and removing airborne particulates from the aircraft air, and the adsorption elements 170, 270 absorb volatile organic compounds (VOCs). The free water collected and drained from the upstream surfaces through the drain channels essentially bypasses the MaVE filter, minimizing the impact of excessive pressure loss on ECS performance. In the aspects shown in FIGS. 1B and 8B, the drain channels are arranged perpendicular to the general horizontal axis of the filter 500 as well as the first and second stage hollow filters 100, 200.

Typically, the intermediate end cap provides a drain gap in the range of from 6 mm to 18 mm, preferably, in the range of from 10 mm to 14 mm, for the first drain channel, and the second end cap provides a drain gap in the range of from 6 mm to 18 mm, preferably, in the range of from 10 mm to 14 mm, for the second drain channel.

Figure 1D:
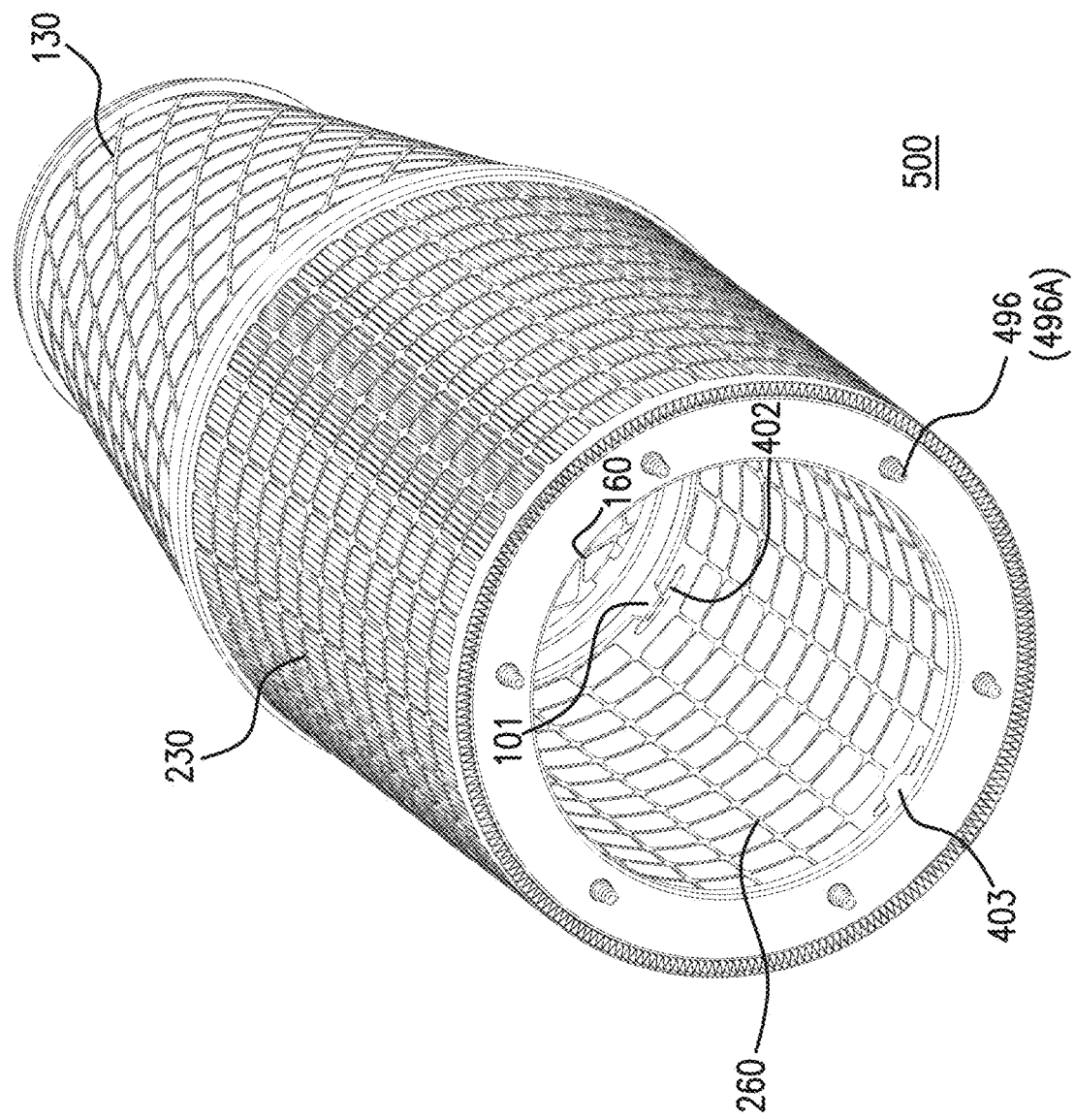

Typically, aspects of the stage filters 100, 200 include respective first and second outer perforated cages 130, 230, to retain and protect the hydrophobic pleated hollow porous media and adsorption elements (each outer cage joined together at a seam, FIG. 1A shows seam 230A for cage 230); and respective first and second inner cores (illustrated as perforated cages) 160, 260 (see, FIG. 1D) to maintain structural integrity of each stage filter. Preferably, as shown in FIGS. 1B, 1D, and 8A, the stage filters 100, 200 include respective perforated cages 140, 240 arranged between the adsorption elements and the inner cores, e.g., to prevent adsorption element particle migration.

In some aspects, as shown in FIGS. 1B, and 1G, 1H, and 1I, housing ends 152 and 172 and end cap 310 are connected to the ends of the first and second stage hollow filters by clip locks 135, 235, 335, each clip lock comprising a hook 136 (on the first housing second end), 236 (on the second housing second end), 336 (on the intermediate end cap), and a slot 101, 402, 403 at respective ends of the inner cages 130 (at the second end first inner cage), 230 (at the first and second ends of the second inner cage) receiving the respective hooks. In one aspect, there are 2 clip locks at each end.

Figure 2A:
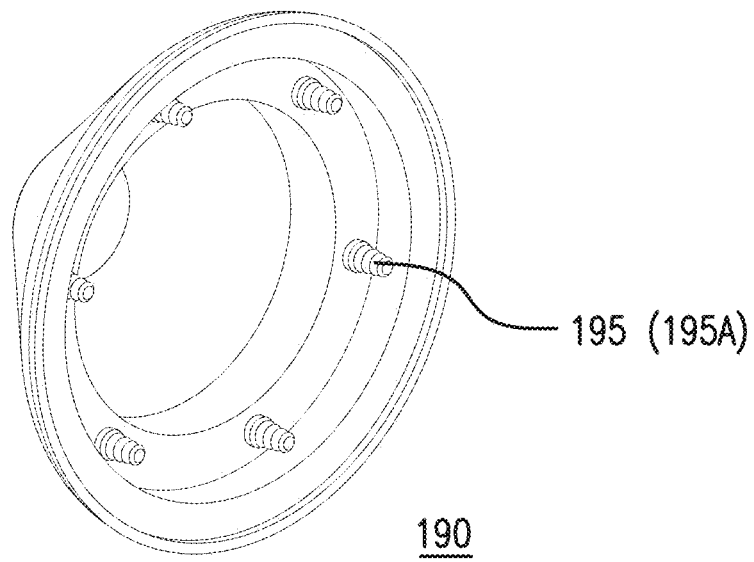
FIGS. 2A-2B are drawings showing the nose cone.
Figure 2B:
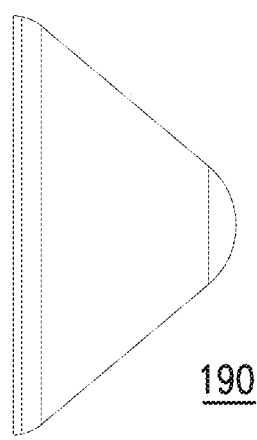

In a preferred aspect of the MaVE filter 500, the filter includes a nose cone 190 (see, FIGS. 2A-2B) attached to the first end cap 110 (see, FIGS. 3A-3C) by a joining arrangement 195 as shown in FIGS. 1B and 1F (similar to the joining arrangement 495 wherein the first housing second end is connected to the intermediate end cap by a joining arrangement as shown in FIG. 1B, and the joining arrangement 496 wherein the second housing second end is joined to the second end cap as shown in FIG. 1I). Advantageously, the inclusion of a nose cone improves the aerodynamic shape of the filter and can reduce pressure losses relating to turbulent airflow. As the nose cone is closed, air enters the filter through the outer perforated cages, rather than through the nose cone 190 and first end cap 110 (see also, FIG. 8B).

Figure 1H:
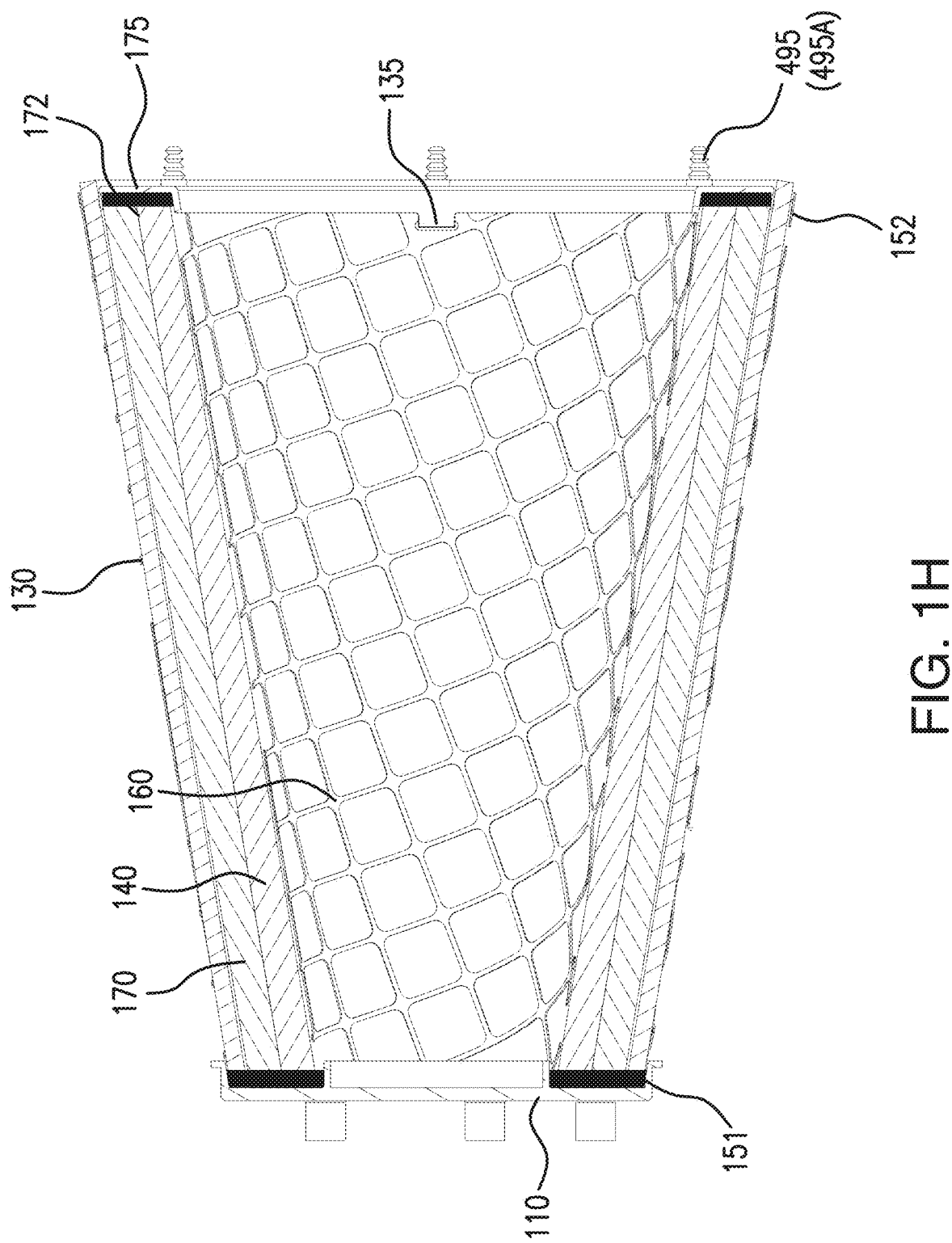

A variety of joining arrangements are suitable for use in aspects of the invention. For example, FIGS. 1B, 1F, and 1I (FIG. 1H showing a male portion 195A (wherein 495A, 496A are similar) of the joining arrangement) show joining arrangements comprising male (195A, 495A, 496A) and female portions (195B, 495B, 496B), and, if desired, adhesive between the portions to lock the housing ends to the end caps. Typically, the end caps include channels providing the female portions with the apertures at the end of the channels facing the housing ends (typically closed at the other ends of the channels) and the male portions include shoulders that engage with the inner walls of the channels.

Aspects of the invention can include any number of joining arrangements for each associated housing end and end cap and/or nose cone, typically, at least two, preferably, three or more, and the illustrated aspect includes 6 for each of the housing ends and end caps.

Preferably, in the aspect illustrated in FIGS. 1B-1D, and 9A, the first adsorption element 170 and the first hydrophobic pleated hollow porous medium 180 each have a tapered configuration, narrower at the first housing first end 151 and wider at the first housing second end 152. Advantageously, the tapered configuration can improve airflow and reduce pressure loss across the filter, and combined with the non-tapered configuration of the second adsorption element and the second hydrophobic pleated hollow porous medium, can maximize the hydrophobic pleated hollow porous media face area available.

Figure 6C:
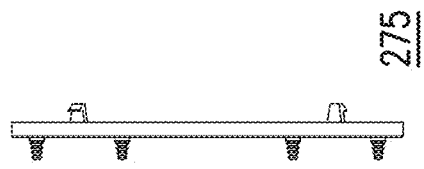
FIGS. 6A-6C are drawings showing the second adsorption element end cap.
Figure 6A:
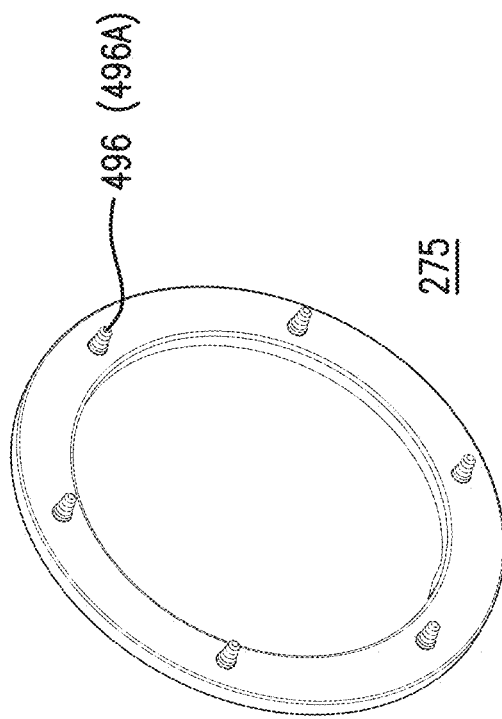
Figure 6B:
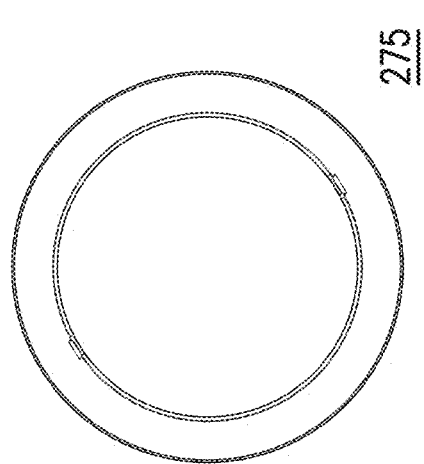

In the illustrated aspects of the MaVE filter 500, the filter further comprises a first adsorption element end cap 175 (see, FIGS. 4A-4C), sealed to a second end 172 of the first adsorption element 170, the first adsorption element end cap 175 contacting the intermediate end cap 310 (see, FIGS. 5A-5C); and a second adsorption element end cap 275 (see, FIGS. 6A-6C), sealed to a second end 272 of the second adsorption element 280, the second adsorption element end cap contacting the second end cap 210 (see, FIGS. 7A-7C).

Preferably, the second end of first hydrophobic pleated hollow porous medium is retained by the intermediate end cap 310, and the second end of the second hydrophobic pleated hollow porous medium is retained by the second end cap 210. Since the second ends of the hydrophobic pleated hollow porous media are retained by the end caps (rather than sealed, e.g., potted, to the end caps) the pleated ends remain open (see, for example, FIGS. 1D, and 8B, wherein FIG. 1D in particular shows the open second end of the second hydrophobic pleated porous medium; the open second end of the first hydrophobic pleated porous medium is arranged the same way) providing an open path for free water to pass from the upstream surfaces of the hydrophobic pleated hollow porous media, through the drainage channels and back into the filtered airflow, as shown in FIG. 8B.

The pleated hydrophobic porous media can have any suitable pore structure, e.g., a pore size (for example, as evidenced by bubble point, or by KL as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on, for example, the size of the particles to be removed, and the desired effluent level of the filtered ar. In some aspects, the hydrophobic porous media (typically, membranes, preferably polytetrafluorethylene (PTFE) membranes) are microporous, having a pore size in the range of 3 micrometers to 20 micrometers, preferably in the range of 5 micrometers to 20 micrometers. Alternatively, or additionally, in some aspects, the hydrophobic porous media (typically, membranes, preferably, PTFE membranes) have a water intrusion pressure in the range of 7 mbar to 25 mbar, preferably in the range of from 10 mbar to 20 mbar.

In some aspects, the adsorption media is immobilized on a porous substrate (e.g., foam) having in the range of 6-12 pores per inch, for example, 10 pores per inch. Additionally, or alternatively, the adsorption media immobilized on a porous substrate (e.g., the substrate having a thickness of about 10 mm) can have a pressure loss of less than 40 Pa at 1.0 m/s, or less than 10 Pa at 0.35 m/s. The adsorption media provide for the adsorption of volatile organic compounds with boiling points of 50° C. or more. Suitable media and substrates are known in the art and are commercially available.

The pleated hydrophobic porous media can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472, 621, and 6,074,869. In those aspects wherein the hydrophobic porous media are porous PTFE membranes, the CWST is typically in the range of 24 to 28 dynes/cm (24 to $28\times10^{-5}$N/cm).

The filter can include additional elements, layers, or components, that can have different structures and/or functions, e.g., at least one of any one or more of the following: prefiltration, support, drainage, spacing and cushioning.

Using FIGS. 9A-9E for reference, the illustrated aspect of the MaVE filter device 1000 according to the invention comprises a main housing 1200 including a main housing body 1100, an inlet duct 1201 connected to a first end 1101 of the main housing body, an outlet duct 1202 connected to a second end 1102 of the main housing body; the illustrated aspect of a MaVE filter 500 arranged in the main housing between the inlet duct and the outlet duct. The inlet port of the inlet duct and/or the outlet port of the outlet duct can be offset from the ends of the filter, e.g., the ports can be offset from the linear axis (first filter first end to second filter second end) of the MaVE filter. As illustrated in FIG. 9C, the outlet duct port 1202A of the outlet duct 1202 can be offset from the second end of the filter 200 if desired depending on the space available in the aircraft. Alternatively, or additionally, the inlet duct port 1201A of the inlet duct 1201 can be offset from the first end of the filter 100 if desired depending on the space available in the aircraft.

In a preferred aspect, the second end 1102 of the main housing body includes at least one cavity for receiving a detent arrangement on the MaVE filter, so that the MaVE filter can be locked in place in the main housing, e.g., so that the MaVE filter does not rotate. Using FIGS. 1B, 1E, and 9B for reference, the illustrated aspect of the MaVE filter includes 3 detent arrangements 291A, 291B, and 291C (shown including outwardly protruding bayonets, see 292B in FIG. 1E) on the second end cap 210, that fit in cavities 1100A, 1100B, and 1100C in the second end of the main housing body. The detent arrangements include threaded stainless steel housings each containing a spring and a ball bearing, where the spring is applying a load to a ball bearing and the bayonets rotate (e.g., about 5°) to lock in place in the cavities in the locked position accepting the spring loaded ball bearing once the MaVE filter is inserted in the main housing body. FIG. 1E (reference 497B) and 7A (references 497A-497C) show the location (a) of the inserted housing(s).

Using the aspect shown in FIGS. 9A and 9I for reference the MaVe filter device includes a first clamping arrangement 1401 clamping the inlet duct 1201 to the first end 1101 of the housing body (FIG. 9A shows the inlet duct and first end in contact without the first clamping arrangement, FIG. 9I shows the structures clamped together by the first clamping arrangement), and a second clamping arrangement 1402 clamping the outlet duct 1202 to the second end 1102 of the main housing body (FIG. 9A shows the outlet duct and second end in contact without the second clamping arrangement, FIG. 9I shows the structures clamped together by the second clamping arrangement). While the clamping arrangements are illustrated as v-band clamps, a variety of clamping arrangement are suitable and are known in the art. In this illustrated aspect, a spider plate 1600 (fitted inside the first housing first end, radially supporting the filter by engaging with the filter first end cap; see, FIGS. 9J-9K) is arranged between the inlet duct and the first end of the housing body, and is also clamped by the first clamping arrangement.

Typically, two or more MaVE filter devices (and two or more systems as discussed below), more typically, three or more MaVE filter devices (and three or more systems), will be utilized in an aircraft, replacing sections of original equipment manufacturing ducting in distribution lines downstream of the air mixing unit (mixer chamber). In some aspects, 5 MaVE filter devices or 5 systems including MaVE filter devices will be utilized, each in separate distribution lines (see, for example, FIG. 10). Preferably, the use of inlet and outlet ducts allow a standardized housing to be fitted into the desired locations and interface with existing aircraft ducting, with minimal pressure loss. The inlet and outlet ducts and/or associated duct ports can be arranged for use in a variety of available spaces. For example, as discussed above and as shown in FIG. 9C, the outlet duct port can be offset from the second end of the filter 200.

In a preferred aspect, a system 2000 for filtering aircraft air comprises the MaVE filter device 1000, further comprising a bypass valve 1500 including a pivotable bypass plate 1501, the bypass valve being arranged in a hollow sleeve 1305 having a first end 1301 and a second end 1302, wherein the sleeve 1305 is arranged between the main housing body and the outlet duct, the sleeve providing an aircraft air flow path through the MaVE filter device partially bypassing the MaVE filter 500 when the bypass valve is open (i.e., the bypass plate is pivoted to provide an open flow path through the sleeve; while a portion of aircraft air passes through the sleeve and outlet duct port 1202A, the MaVE filter is not fully bypassed, as a portion of aircraft air will pass through the filter 500, including passing through the first and second stage filters and through the second end cap). In some aspects, partially bypassing the MaVE filter can include passing some aircraft air through at least one component of the MaVE filter 500 (such as the first and/or second stage filter), but without passing through the second end cap, before passing the air through the sleeve and outlet duct port.

The aspect shown in FIGS. 9C and 9H also show a bypass valve actuator 1510 including a stepper motor for actuating the bypass valve 1500. When the bypass valve is closed (i.e., the bypass plate is pivoted to block the flow path through the sleeve) aircraft air flows through the MaVE filter 500 (including through the second end cap), rather than the sleeve).

In some aspects, the bypass valve can be operated such that the bypass plate is pivoted less than a full pivot to reduce the flow through the sleeve rather than block the flow through the sleeve.

A variety of bypass valves and associated components such as valve actuators and stepper motors are suitable as is known in the art. Commercially available valves and associated components are suitable.

The sleeve can be attached by clamping arrangements such as, for example v-band clamps and/or elastomeric sleeves. Illustratively, FIG. 9L shows first end 1301 of the hollow sleeve and an elastomeric sleeve 1325 sealing the first end 1301 (hollow sleeve inlet) to the main housing body, clamped in place with a clamping arrangement 1403 illustrated as two band clamps (1403A, 1403B), and second end 1302 of the hollow sleeve (hollow sleeve outlet) clamped to a main housing body end cap 1105 by a clamping arrangement 1404 illustrated as a v-band clamp.

A control system 2500 (e.g., a motor control unit) communicates with the various systems 2000 for filtering aircraft air (see, FIG. 11 showing an exemplary control system for controlling the bypass valve(s) in systems 2000 and communicating with an aircraft BUS and central processing unit that receives data from the sensors and sends commands to the motor control unit), e.g., wherein the systems 2000 are installed in the flight deck supply line and low-pressure distribution lines in each of four cabin distribution ducts), including sensors for monitoring target ECS parameters such as, one or more of any of the following: recirculation fan performance (e.g., recirculation fan stall); mixer chamber pressure (e.g., mixer chamber over pressure such as ≥25 mbar); duct flow imbalance (single line/individual duct blockage); and low flow to flight deck (cockpit flow reduction). The operation (actuation or opening) of the bypass valve(s) enables the MaVE filter(s) to be bypassed, ensuring air flow to the cabin and flight deck is maintained once one or the more target ECS parameters is/are achieved. The particular target parameters and/or specific values or rates of the target parameters and the timing of operations may vary depending on, for example, the particular aircraft and/or the requirements of the aircraft manufacturer.

Preferably, as illustrated in FIG. 9A, a system 2000 for filtering aircraft air includes at least an upstream differential pressure sensor 1801 arranged in one filter device 1000 upstream of the first stage filter 100 (e.g., fitted to the inlet duct of a single filter device), and at least a downstream differential pressure sensor 1802 arranged in each of the filter devices 1000 downstream of the second stage filter 200 (e.g., fitted to the outlet duct of each filter device). For example, with reference to FIG. 11 (discussed in more detail below), 1801 represents differential pressure sensor SP1 (arranged upstream, fitted to the inlet duct of one filter device 1000 in one system 2000), wherein if the aircraft included 5 systems each including separate MaVE filter devices, 1802 (arranged downstream, fitted to the outlet duct of each filter device 1000 in each of the other systems 2000) could represent SP3 in the system also including SP1, and 1802 could represent (individually) SP4, SP5, SP6, and SP7 in the other 4 systems (that do not include upstream differential pressure sensor 1801).

FIG. 11 shows an exemplary arrangement of differential pressure sensors in a control system 2500 (e.g., motor control unit) controlling bypass valves connected to MaVE filter devices in systems 2000 (wherein "STBD" refers to starboard (right side); port refers to the left side; "D/S" refers to downstream, "Aft" refers to the rear; and "DP" refers to differential pressure). Thus, for example, in order to prevent the recirculation fan from stalling to maintain recirculation air flow and protect the recirculation fans, fan differential pressure derived from sensor SP1 and sensor SP2 (differential pressure sensors SP1 and SP2 are connected to existing pressure tapings built into the recirculation filter housings. As these tapings are positioned between the recirculation filter and fans, a depression rather than a positive pressure is generated by the fan) to sensor SP8 allows derivation of the flow state, to ensure that fan flow is not reduced below a target parameter value (rate), such as, for example, 26-34 mbar differential pressure. With respect to cockpit flow, flow can be maintained if, for example, the bypass valve opens if there is a blockage in the cockpit line, or if there is a reduction in the recirculation fan flow below the minimum requirement (e.g., thus the downstream static differential can be monitored, for example, sensor SP5 to sensor SP6). Monitoring downstream static differential can reflect individual duct blockage as signified by differences in static pressures downstream of each MaVE device. Protecting the mixer chamber from exceeding the certified limit (e.g., 25 mbar) for extended periods of time under normal operating conditions can be provided by monitoring sensor SP8 arranged upstream of a MaVE device.

While the specific values of the target parameters and timing of operations may vary depending on, for example, the particular aircraft, the following is one example of ongoing monitoring (e.g., even when the valves are open to differentiate between a transient and permanent blocked condition) by the control system: If a bypass valve is activated (actuated/opened), after W minutes (e.g., 5 minutes) of operation, the control system should close the bypass valve(s); if any of the target parameters values are subsequently reached within X minutes (e.g., 2 minutes), the bypass valve(s) are re-activated; the control system repeats a bypass valve closing cycle twice more, once after further Y minutes (e.g., 15 minutes), and then subsequently after further Z minutes (e.g., 30 minutes) if necessary. If after a third attempt, bypass valve activation is still triggered, all bypass valves remain activated and checks for closing are done (e.g., hourly)

The following example further illustrates the invention but, of course, should not be construed as in any way limiting its scope.

EXAMPLE

This example demonstrates that a MaVE filter device according to an aspect of the invention manages water over a range of water injection rates. The MaVE filter device exhibits stable operation at a water injection rate of 350 ml/min for over 60 minutes with a maximum filter differential pressure of 2.5 to 3.0 mbar over the entire period.

The results are compared to prototype filter devices without water management features. These prototype filter devices exhibit stable operation at a water injection rate of 20 ml/min, but when challenged with 200 ml/min, the pressure drop across the filter increases by 9.5 mbar, wherein the test is terminated after 16 minutes when the filter differential pressure is 11.5 mbar.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A mist and vapor eliminating filter comprising:
a first stage hollow filter and a second stage hollow filter;
 (a) the first stage hollow filter comprising
  a first housing having a first housing first end and a first housing second end; and, arranged in the first housing:
  (i) a first adsorption element comprising activated carbon and/or activated clay; and,
  (ii) a first hydrophobic pleated hollow porous medium surrounding the first adsorption element;
  the first stage hollow filter including a first end cap connected to the first housing first end;
 (b) the second stage hollow filter comprising
  a second housing having second housing first end and a second housing second end; and, arranged in the second housing:
  (iii) a second adsorption element comprising activated carbon and/or activated clay;
  (iv) a second hydrophobic pleated hollow porous medium surrounding the second adsorption element;
  the second stage hollow filter including a second end cap connected to the second housing second end;
 (c) wherein the first housing second end is connected to the second housing first end by an intermediate end cap;
  the intermediate end cap including a first drain channel between the first housing second end and the second housing first end; and,
  the second end cap including a second drain channel at the second housing second end.

2. The mist and vapor eliminating filter of claim 1, wherein the first adsorption element and the first hydrophobic pleated hollow porous medium each have a tapered configuration.

3. The mist and vapor eliminating filter of claim 1, further comprising a first adsorption element end cap, sealed to an end of the first adsorption element, the first adsorption element end cap contacting the intermediate end cap; and
a second adsorption element end cap, sealed to an end of the second adsorption element, the second adsorption element end cap contacting the second end cap.

4. The mist and vapor eliminating filter of claim 1, wherein the first hydrophobic pleated hollow porous medium is retained by the intermediate end cap, and the second hydrophobic pleated hollow porous medium is retained by the second end cap.

5. The mist and vapor eliminating filter of claim 1, wherein the intermediate end cap provides a drain gap in the range of from 6 mm to 18 mm for the first drain channel, and the second end cap provides a drain gap in the range of from 6 mm to 18 mm for the second drain channel.

6. The mist and vapor eliminating filter of claim 1, including at least two joining arrangements connecting the first housing second end to the intermediate end cap, and at least two additional joining arrangements connecting the second housing second end to the second end cap.

7. The mist and vapor eliminating filter of claim 1, wherein the first stage hollow filter includes a first stage outer cage and a first stage inner core; and, the second stage hollow filter includes a second stage outer cage and a second stage inner core.

8. A mist and vapor eliminating filter device comprising
 (a) a main housing including a main housing body, an inlet duct connected to a first end of the main housing body, and an outlet duct connected to a second end of the main housing body; and,
 (b) the mist and vapor eliminating filter of claim 1 arranged in the main housing between the inlet duct and the outlet duct.

9. A method of filtering aircraft cabin air, the method comprising passing the aircraft air through the mist and vapor eliminating filter device of claim 8.

10. The method of claim 9, including collecting free water on an upstream surface of the first hydrophobic pleated hollow porous medium and collecting free water on an upstream surface of the second hydrophobic pleated hollow porous medium.

11. The method of claim 10, including passing the collected free water on the upstream surface of the first hydrophobic pleated hollow porous medium through the first drain channel, and passing the collected free water on the upstream surface of the second hydrophobic pleated hollow porous medium through the second drain channel.

12. The mist and vapor eliminating filter of claim 2, further comprising a first adsorption element end cap, sealed to an end of the first adsorption element, the first adsorption element end cap contacting the intermediate end cap; and
a second adsorption element end cap, sealed to an end of the second adsorption element, the second adsorption element end cap contacting the second end cap.

13. The mist and vapor eliminating filter of claim 2, wherein the first hydrophobic pleated hollow porous medium is retained by the intermediate end cap, and the second hydrophobic pleated hollow porous medium is retained by the second end cap.

14. The mist and vapor eliminating filter of claim 3, wherein the first hydrophobic pleated hollow porous medium is retained by the intermediate end cap, and the second hydrophobic pleated hollow porous medium is retained by the second end cap.

15. The mist and vapor eliminating filter of claim 2, wherein the intermediate end cap provides a drain gap in the range of from 6 mm to 18 mm for the first drain channel, and the second end cap provides a drain gap in the range of from 6 mm to 18 mm for the second drain channel.

16. The mist and vapor eliminating filter of claim 3, wherein the intermediate end cap provides a drain gap in the range of from 6 mm to 18 mm for the first drain channel, and the second end cap provides a drain gap in the range of from 6 mm to 18 mm for the second drain channel.

17. The mist and vapor eliminating filter of claim 4, wherein the intermediate end cap provides a drain gap in the range of from 6 mm to 18 mm for the first drain channel, and the second end cap provides a drain gap in the range of from 6 mm to 18 mm for the second drain channel.

18. A mist and vapor eliminating filter device comprising
 (a) a main housing including a main housing body, an inlet duct connected to a first end of the main housing body, and an outlet duct connected to a second end of the main housing body; and, (b) the mist and vapor eliminating filter of claim 2 arranged in the main housing between the inlet duct and the outlet duct.

19. A mist and vapor eliminating filter device comprising (a) a main housing including a main housing body, an inlet duct connected to a first end of the main housing body, and an outlet duct connected to a second end of the main housing body; and, (b) the mist and vapor eliminating filter of claim 3 arranged in the main housing between the inlet duct and the outlet duct.

20. A mist and vapor eliminating filter device comprising (a) a main housing including a main housing body, an inlet duct connected to a first end of the main housing body, and an outlet duct connected to a second end of the main housing body; and, (b) the mist and vapor eliminating filter of claim 4 arranged in the main housing between the inlet duct and the outlet duct.

* * * * *